US010594635B2

(12) United States Patent
Kuncheria et al.

(10) Patent No.: US 10,594,635 B2
(45) Date of Patent: Mar. 17, 2020

(54) MANAGING CUSTOMER RELATIONSHIP USING MULTIPLE CHAT SERVERS DESIGNED TO INTERFACE WITH SERVICE APPLICATIONS

(71) Applicant: Oracle International Corporation, Redwood Shores, CA (US)

(72) Inventors: Anoop Isaac Kuncheria, Thiruvananthapuram (IN); Abraham George, Thiruvananthapuram (IN); Sreeram Gopal, Thiruvananthapuram (IN)

(73) Assignee: Oracle International Corporation, Redwood Shores, CA (US)

( * ) Notice: Subject to any disclaimer, the term of this patent is extended or adjusted under 35 U.S.C. 154(b) by 104 days.

(21) Appl. No.: 15/957,932

(22) Filed: Apr. 20, 2018

(65) Prior Publication Data

US 2019/0327193 A1 Oct. 24, 2019

(51) Int. Cl.
*H04L 12/58* (2006.01)
*H04L 29/08* (2006.01)

(52) U.S. Cl.
CPC ............ *H04L 51/046* (2013.01); *H04L 51/16* (2013.01); *H04L 67/10* (2013.01);
(Continued)

(58) Field of Classification Search
CPC ..... H04L 67/24; H04L 67/1095; H04L 51/02; H04L 51/04; H04L 51/046; H04L 67/10; H04L 67/1036
(Continued)

(56) References Cited

U.S. PATENT DOCUMENTS 7,275,048 B2 9/2007 Bigus et al.
10,110,523 B2 * 10/2018 Badge ................... H04L 51/046
(Continued)

FOREIGN PATENT DOCUMENTS

CN  100518070 C  7/2009
EP  1920393 A2  5/2008
(Continued)

OTHER PUBLICATIONS

Colace F, De Santo M, Pascale F, Lemma S, Lombardi M. BotWheels: a Petri Net based Chatbot for Recommending Tires. InDATA 2017 (pp. 350-358). (Year: 2017).*
(Continued)

*Primary Examiner* — James N Fiorillo
(74) *Attorney, Agent, or Firm* — IPHorizons PLLC; Narendra Reddy Thappeta

(57) ABSTRACT

An interfacing unit provided according to an aspect of the present disclosure facilitates an user to be serviced based on multiple chat servers in a single chat session. In an embodiment, the interfacing unit receives a request on a chat session for a chat conversation from a user, identifies a first suitable chat server for generating responses for the chat conversation, and forwards a first sequence of inputs received from the end user to the first suitable chat server. The corresponding responses are forwarded back to the end user. The interfacing unit then forwards a received second sequence of inputs to a second chat server to generate a second sequence of messages corresponding to the second sequence of inputs. The interfacing unit forwards the second sequence of messages as respective responses to the second sequence of inputs.

20 Claims, 18 Drawing Sheets

(52) U.S. Cl.
CPC ...... *H04L 67/1036* (2013.01); *H04L 67/1095* (2013.01); *H04L 51/02* (2013.01)

(58) Field of Classification Search
USPC .................................. 709/204, 206, 227
See application file for complete search history.

(56) References Cited

U.S. PATENT DOCUMENTS

| | | | | |
|---|---|---|---|---|
| 2002/0161896 | A1* | 10/2002 | Wen | H04L 12/1827 709/227 |
| 2003/0220972 | A1* | 11/2003 | Montet | H04L 51/04 709/204 |
| 2006/0080130 | A1* | 4/2006 | Choksi | G06Q 30/016 705/1.1 |
| 2010/0317376 | A1* | 12/2010 | Anisimov | H04L 51/38 455/466 |
| 2011/0191417 | A1 | 8/2011 | Rathod | |
| 2013/0055113 | A1* | 2/2013 | Chazin | H04L 12/1822 715/758 |
| 2013/0346513 | A1* | 12/2013 | Jia | H04L 67/1036 709/206 |
| 2014/0279050 | A1* | 9/2014 | Makar | G06Q 30/0269 705/14.66 |
| 2016/0094492 | A1* | 3/2016 | Li | H04L 51/02 709/206 |
| 2016/0099892 | A1* | 4/2016 | Palakovich | H04L 51/04 709/206 |
| 2016/0140236 | A1* | 5/2016 | Estes | G06N 5/022 707/709 |
| 2016/0149839 | A1* | 5/2016 | Yi | H04L 67/1095 709/206 |
| 2017/0132207 | A1* | 5/2017 | Goldstein | H04L 51/04 |
| 2017/0180276 | A1* | 6/2017 | Gershony | H04L 51/02 |
| 2017/0289069 | A1* | 10/2017 | Plumb | H04L 51/02 |
| 2017/0295114 | A1 | 10/2017 | Goldberg et al. | |
| 2017/0310613 | A1* | 10/2017 | Lalji | H04L 51/02 |
| 2018/0212904 | A1* | 7/2018 | Smullen | H04L 51/02 |
| 2018/0248818 | A1* | 8/2018 | Zucker | G06F 17/277 |
| 2018/0331980 | A1* | 11/2018 | Jernstrom | H04L 51/02 |
| 2018/0367484 | A1* | 12/2018 | Rodriguez | G06Q 10/101 |

FOREIGN PATENT DOCUMENTS

| | | |
|---|---|---|
| EP | 2821943 A1 | 1/2015 |
| EP | 2973312 A1 | 1/2016 |
| KR | 20040092256 A | 11/2004 |
| WO | 2004044708 A2 | 5/2004 |
| WO | 2015077398 A1 | 5/2015 |
| WO | WO/2017/172651 | 5/2017 |

OTHER PUBLICATIONS

Colace F, De Santo M, Pascale F, Lemma S, Lombardi M. BotWheels: a Petri Net based Chatbot for Recommending Tires. InDATA 2017 (pp. 350-358). (Year: 2017) (Year: 2017).*
"Group bots" with Messenger Chat Extensions, https://chatbotsmagazine.com/live-from-f8-group-bots-with-messenger-chat-extensions-641a3d66b367, downloaded circa Jul. 18, 2017, pp. 1-6.
hi.guru: Chat to your customers on their terms. AI, Chatbot enabled customer support, https://hi.guru/, downloaded circa Jul. 18, 2017, pp. 1-6.
Avaamo—Chatbot for Enterprise—Automate & Reduce Labor Costs, https://avaamochatbot.blogspot.in/search/label/Enterprise%20bots?view=classic, downloaded circa Jul. 21, 2017, pp. 1-3.
Avaamo—Delivering AI enterprise bots to Facebook, http://www.avaamo.com/facebook-workplace/, downloaded circa Jul. 21, 2017, pp. 1-3.
Why the Future of Bots will be Multi-Platform, https://chatbotsmagazine.com/why-the-future-of-bots-will-be-multi-platform-67c503afaa7, downloaded circa Jul. 17, 2017, pp. 1-9.
Are Conversational Systems the Future of Web Interface?, http://www.cms-connected.com/News-Archive/April-2017/Conversational-Systems-Chatbots-Voice-Activated-Assistants-Future-of-Web-User-Interface, downloaded circa Jul. 21, 2017, pp. 1-5.
Facebook messenger gets KLM Royal Dutch Airlines bot, https://www.slashgear.com/facebook-messenger-gets-klm-royal-dutch-airlines-bot-31434116/, downloaded circa Jul. 18, 2017, pp. 1-5.
Amazon Alexa, https://developer.amazon.com/alexa, downloaded circa Jul. 21, 2017, pp. 1-5.
T. Bray, Ed., The JavaScript Object Notation (JSON) Data Interchange Format, Request for Comments: 8259, date Dec. 2017, pp. 1-16, ISSN: 2070-1721, Internet Engineering Task Force (IETF).
Power through AI and Automation with Chatbots, https://www.infosys.com/services/microsoft-dynamics/Documents/AI-Automation-Chatbots-Web.pdf, downloaded circa Feb. 13, 2018, pp. 1-8.
Microsoft AI Platform Build Intelligent Software, https://azure.microsoft.com/mediahandler/files/resourcefiles/5467086f-7c5a-4106-8615-7f5e4ad217fd/microsoft-ai-platform-whitepaper.pdf, downloaded circa Feb. 13, 2018, pp. 1-10.
Instantechnologies—Chatbots, http://instantechnologies.com/en/chatbot/, downloaded circa Feb. 13, 2018, pp. 1-7.
SnatchBot, https://snatchbot.me/brochures/Brochure-SnatchBot.pdf, downloaded circa Feb. 13, 2018, pp. 1-32.
International Search Report and Written Opinion dated Aug. 8, 2019 from International Application No. PCT/US19/28016, 09 pages.
Don Goodman-Wilson, "Bot-to-bot communication models for Slack", https://medium.com/@degoodmanwilson/bot-to-bot-communication-models-for-slack-ec010215c11d, retrieved from the Internet on Jul. 31, 2019, 11 pages.

* cited by examiner

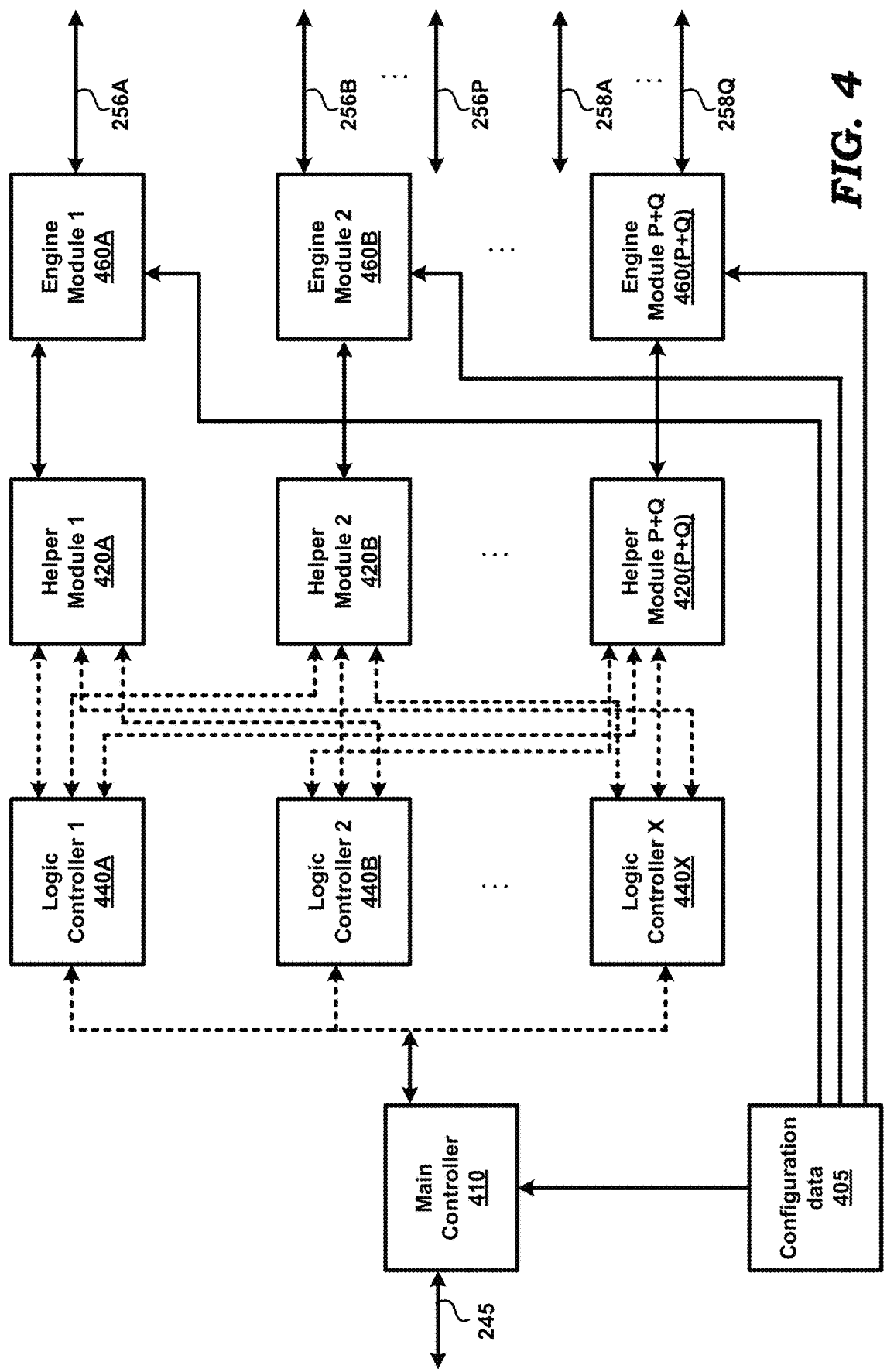

```
{
    "name": "Tripmaker Bot",
    "description": "This is the bot configuration file",
    "type": "admin",
    "bots": [
        {
            "Module-1": {
                "Travel": [
                    {
                        "name": "travel.ai",
                        "description": "nlp",
                        "applicationId": "TudtzI2kL0x97BmYOPjD",
                        "username": "secret",
                        "password": "secret",
                        "intents": {
                                "name": "Intents_1",
                                "file": "intent1"
                                },
                        "url": "service-url"
                    },
                    {
                        "name": "image.ai",
                        "description": "image",
                        "applicationId": "V5JVJKSpa3GvEs5yPCbH",
                        "username": "secret",
                        "password": "secret",
                        "intents": {
                                "name": "Intents_2",
                                "file": "intent2"
                                },
                        "url": "service-url"
                    },
                    {
                        "priority": "1",
                        "description": "Above property can be used to override default priority"
                    }
                ],
                "properties" : {
                        "namespace" : "/business_core/src/module1",
                        "file": "module1"
                        }
            },
```

```
"Module-2": {
  "Hotel": [
    {
      "name": "hotel.ai",
      "description": "nlp",
      "applicationId": "VXUhtONsFdPrLHFEDoZJ",
      "username": "secret",
      "password": "secret",
      "intents": {
        "name", "Intents_3"   ~ 525
        "file": "intent3"
      },
      "url": "service-url"
    },
    {
      "name": "image.ai",
      "description": "image",
      "applicationId": "ftXM6R7o3JmtEjCdRLkF",
      "username": "secret",
      "password": "secret",
      "intents": {
        "name", "Intents_4"   ~ 526
        "file": "intent4"
      },
      "url": "service-url"
    },
    {
      "priority": "2",
      "description": "Above property can be used to override default priority"
    }
  ],
  "properties": {
    "namespace": "/business_core/src/module2",
    "file": "module2"
  }
}
```

521 — name block (hotel.ai)
520 — Module-2 / Hotel
522 — image.ai block
523 — priority
524 — properties

FIG. 5C

```
"Module-3": {
  "Taxi": [
    {
      "name": "taxi.ai",
      "description": "nlp",
      "applicationId": "Sasfdam$sdfads",
      "username": "secret",
      "password": "secret",
      "intents": {
        "name", "Intents_5"   ~ 528A
        "file": "intent5"
      },
      "url": "service-url"
    },
    {
      "name": "image.ai",
      "description": "image",
      "applicationId": "aajfikkkjkVish",
      "username": "secret",
      "password": "secret",
      "intents": {
        "name", "Intents_6"   ~ 528B
        "file": "intent6"
      },
      "url": "service-url"
    },
    {
      "priority": "3",
      "description": "Above property can be used to override default priority"
    }
  ],
  "properties": {
    "namespace": "/business_core/src/module3",
    "file": "module3"
  }
}
```

528 — Module-3 / Taxi block

```
},
"intents": [
{
    "intents_1": [
        "START_INTENT": {
            "description": "Start Intent",
            "name": "start",
            "weight": ".7"
        },                                                      ⎫
                                                                ⎬ 531
                                                                ⎭
        "POSITIVE_END_INTENT": {
            "description": "Positive End Intent",
            "name": "end+",
            "weight": "1"
        },                                                      ⎫
                                                                ⎬ 532
                                                                ⎭
        "NEGATIVE_END_INTENT": {
            "description": "Negative End Intent",
            "name": "end-",
            "weight": "1"
        },                                                      ⎫
                                                                ⎬ 533
                                                                ⎭
        "GET_CUSTOMER_PREFERENCE": {
            "description": "Custom intent to get customer preference",
            "name": "c$get_customer_info",
            "weight": "1"
        },                                                      ⎫
                                                                ⎬ 534
                                                                ⎭
        "ISSUE_BOARDING_PASS": {
            "description": "Custom intent to issue a boarding pass",
            "name": "c$issue_boarding_pass",
            "weight": "1"
        },                                                      ⎫
                                                                ⎬ 535
                                                                ⎭
    ]
                                                                ⎫
                                                                ⎬ 530
                                                                ⎭
```

FIG. 5D

```
    "intents_2": [
        "POSITIVE_END_INTENT": {
            "description": "Positive End Intent which is returned if image verification returns true",
            "name": "c$image_success",
            "weight": "1"
        },                                                      ⎫
                                                                ⎬ 541
                                                                ⎭
        "NEGATIVE_END_INTENT": {
            "description": "Negative End Intent which is returned if image verification returns false",
            "name": "c$image_failure",
            "weight": "1"
        },                                                      ⎫
                                                                ⎬ 542
                                                                ⎭
    ]
                                                                ⎫
                                                                ⎬ 540
                                                                ⎭
```

FIG. 5E

```
"Intents_3":{
    "START_INTENT":{
        "description":"Start Intent",
        "name":"start",
        "weight":"1"
    },
    "POSITIVE_END_INTENT":{
        "description":"Positive End Intent",
        "name":"end+",
        "weight":"1"
    },
    "NEGATIVE_END_INTENT":{
        "description":"Negative End Intent",
        "name":"end-",
        "weight":"1"
    },
    "GET_CUSTOMER_PREFERENCE":{
        "description":"Custom intent to get customer preference",
        "name":"c$get_customer_info",
        "weight":"1"
    },
    "ISSUE_HOTEL_RESERVATION":{
        "description":"Custom intent to issue a hotel reservation",
        "name":"c$issue_hotel_reservation",
        "weight":"1"
    },
}
```
⎵ 550

*FIG. 5F*

```
"Intents_4":{
    "START_INTENT":{
        "description":"Start Intent",
        "name":"start",
        "weight":"1"
    },
    "POSITIVE_END_INTENT":{
        "description":"Negative End Intent which is returned if image verification returns true",
        "name":"c$image_success",
        "weight":"1"
    },
    "NEGATIVE_END_INTENT":{
        "description":"Negative End Intent which is returned if image verification returns false",
        "name":"c$image_failure",
        "weight":"1"
    }
}
```
⎵ 560

*FIG. 5G*

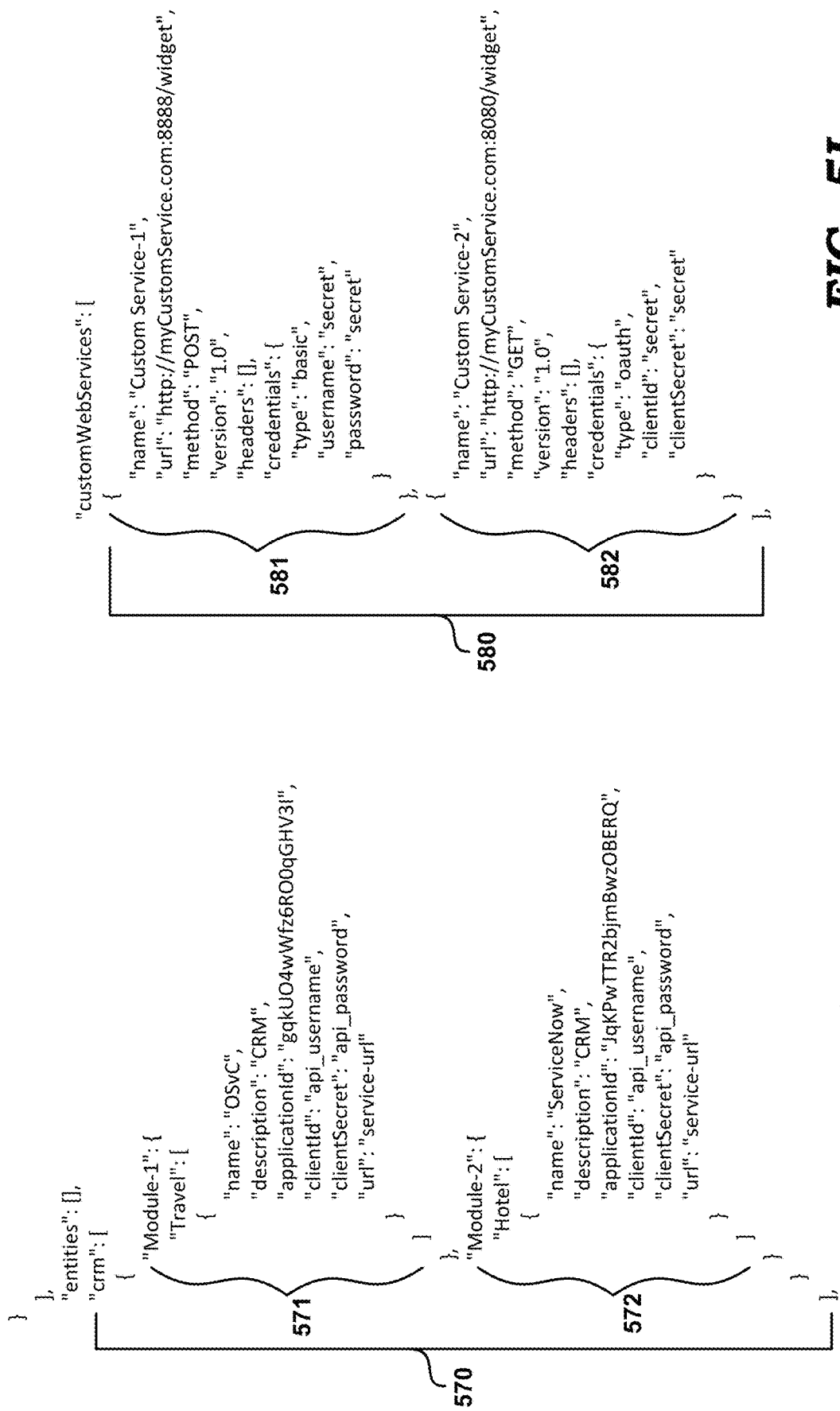

```
"channels": [
    {
        "name": "acme",
        "type": "text",
        "enabled": true,
        "pageId": "JqKPwTTR2bjmBwzOBERQ",
        "customerId": "will be fetched from customer request body",
        "config": {
            "type": "webhook",
            "webhookUri": "https://facebook.com/apps/tripmaker/botWebhook/messages"
        }
    },
    {
        "name": "beta",
        "type": "voice",
        "enabled": true,
        "companyId": "4H649OyjEiFE8BbMclcO",
        "customerId": "will be fetched from customer request body",
        "config": {
            "type": "webhook",
            "webhookUri": "https://amazon.com/alexa/apps/tripmaker/botWebhook/messages"
        }
    }
],
```

- 590: entire block
- 591: first channel object (acme)
- 592: second channel object (beta)

MANAGING CUSTOMER RELATIONSHIP USING MULTIPLE CHAT SERVERS DESIGNED TO INTERFACE WITH SERVICE APPLICATIONS

BACKGROUND OF THE DISCLOSURE

Technical Field

The present disclosure relates to customer relationship management (CRM), and more specifically to managing customer relationship using multiple chat servers designed to interface with service applications.

Related Art

A chat server is generally accessible on networks such as world-wide-web (WWW) and operates based on inputs in formats similar to natural language. In a common scenario, a chat server receives inputs from an end user (human being) and provides corresponding responses in an interactive fashion. Chat servers may employ technologies such as artificial intelligence in forming the respective responses, as is also well known in the relevant arts.

Chat servers are often designed to interface with service applications, typically for providing enhanced functionality or convenient user interfaces for the end users. Examples of service applications include travel applications, weather applications, hotel booking applications, etc.

In a common scenario, a chat server invokes the services provided by appropriate service application, depending on the specific context within the interactive dialogue with the end user. For example, if an end user engages in an online chat conversation with reference to travel, the chat server may use the services of service applications related to travel, weather, etc., to serve the end user.

Aspects of the present disclosure are directed to managing customer relationship using multiple chat servers designed to interface with service applications.

BRIEF DESCRIPTION OF THE DRAWINGS

Example embodiments of the present disclosure will be described with reference to the accompanying drawings briefly described below.

FIG. 4 is a block diagram illustrating the internal architecture of an interfacing unit according to an embodiment of the present disclosure.

FIGS. 5A-5J together depict a sample configuration data implemented in the interface unit in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1A:
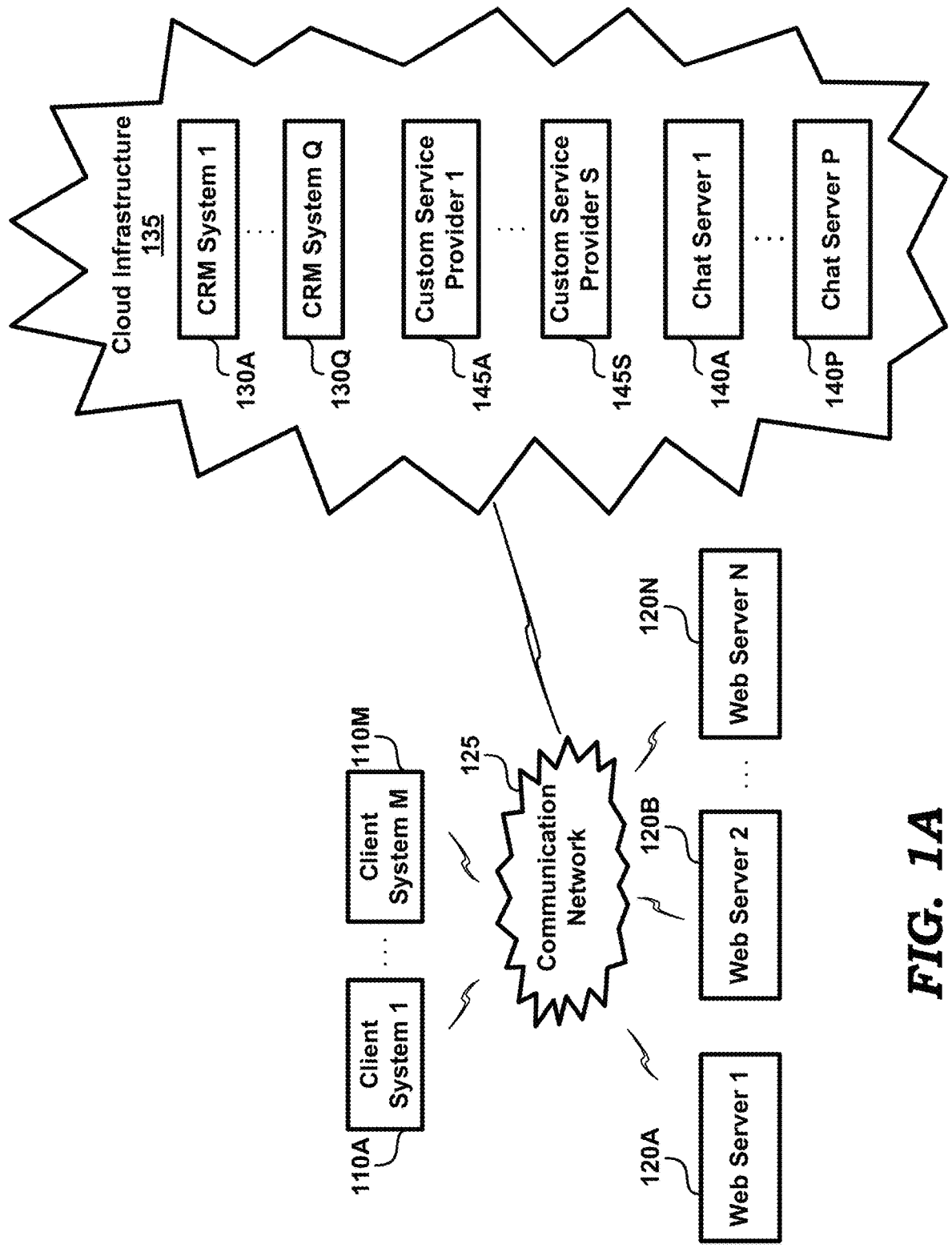
FIG. 1A is a block diagram illustrating an example environment in which several aspects of the present disclosure can be implemented.

An interfacing unit provided according to an aspect of the present disclosure facilitates a user to be serviced based on multiple chat servers in a single chat session. In an embodiment, the interfacing unit receives a request on a chat session for a chat conversation from a user, identifies a first suitable chat server for the chat conversation, and forwards a first sequence of inputs received from the end user on the chat session to the first suitable chat server. The messages generated as a result are forwarded back to the end user as corresponding responses. The interfacing unit then forwards a received second sequence of inputs to a second chat server to receive a second sequence of messages corresponding to the second sequence of inputs. The interfacing unit forwards the second sequence of messages as respective responses to the second sequence of inputs.

According to another aspect of the present disclosure, the operation of the interfacing unit is controlled by configuration data that can be configured by an administrator. In an embodiment, the configuration data indicates a respective set of chat servers available for each broad purpose of a multiple broad purposes. Each of the first sequence of inputs and the second sequence of inputs is encapsulated in a respective network packet with a destination field indicating that the network packet terminates at the interfacing unit. Each of the first sequence of messages and the second sequence of messages is encapsulated in a respective packet with a source field indicating that the packet originates at the interfacing unit. The configuration data indicates that first chat server and the second chat server are contained in a first set of chat servers for a first broad purpose. The interfacing unit examines the configuration data to determine that the first sequence of inputs is to be forwarded to the first chat server and that the second sequence of inputs is to be forwarded to the second chat server.

According to one more aspect of the present disclosure, the configuration data further indicates a respective action required for each intent of a respective multiple intents manifested in chat conversations. The interfacing unit may determine a sequence of current intents manifested at corresponding time instances in the chat conversation, and a respective action to be performed for each current intent by examining the configuration data. The interfacing unit may perform the determined corresponding action.

According to another aspect, each of the inputs and the messages is according to natural language, wherein the inputs are forwarded to the set of chat servers in natural language and the messages are received from the set of chat servers also in natural language. In an embodiment, each intent is provided by the corresponding chat server along with the response packet. In another embodiment, the switch from the first chat server to the second chat server is based on an entry in the configuration data.

According to another aspect, upon completion of processing of a first purpose, the interfacing unit forwards, to each of the set of chat servers, a set of metadata representing a current state of the chat transaction as a part serving the first purpose. The interfacing unit determines a set of suitable chat servers depending on the respective responses received from each of the set of chat servers, and sets one of the set of suitable chat servers as the second chat server.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1A is a block diagram illustrating an example environment in which several aspects of the present disclosure can be implemented. The block diagram is shown containing client systems 110A-110M (where M can be any positive integer), web servers 120A-120N (where N can be any positive integer), communication network 125 and cloud infrastructure 135. Cloud infrastructure 135 in turn is shown containing CRM Systems 130A-130Q (where Q can be any positive integer), Custom Service Providers 145A-145S (where S can be any positive integer) and chat servers 140A-140P (where P can be any positive integer).

Merely for illustration, only representative number/type of systems is shown in FIG. 1A. Many environments often contain many more systems, both in number and type, depending on the purpose for which the environment is designed. Each block of FIG. 1 is described below in further detail.

Communication network 125 represents a network providing connectivity between web servers 120A-120N, client systems 110A-110M and cloud infrastructure 135. Communication network 125 may be an internet (including the world-wide connected Internet), a combination of internet and intranet, etc. Communication network 125 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by communication network 125. When the packet contains content such as port numbers, which specifies a target application, the packet may be said to be directed to such application as well.

Each of the client systems 110A-110M represents a system such as a terminal, personal computer, workstation, mobile device, computing tablet, etc., used by users to interface with chat servers 140A-140P and CRM systems 130A-130Q. The chats with chat servers are in 'natural language' implying the corresponding content is represented in ways humans normally converse with each other using languages such as English, German, French, Spanish, Hindi and Kannada.

In relation to chats, the interface may be realized using IP packets, with the packets from the client system being directed to the chat servers at respective chat server, and the packets from the chat servers being directed to the respective client system. Similarly, IP packets may be used for interfacing with CRM systems as well, but according to suitable interfaces for the corresponding interactions.

Each of web servers 120A-120N represents a server, such as a web/application server, providing services to external systems. In the illustrative embodiments, web servers 120A-120N are assumed to implement various travel related services such as flight reservations, hotel bookings, taxi reservations, etc., accessed by chat servers, though the web servers can implement and provide any services as suitable in corresponding environments.

Cloud infrastructure 135 is shown hosting customer relationship management (CRM) systems 130A-130Q and chat servers 140A-140P. Cloud infrastructure 135 generally enables ubiquitous access over the internet to shared pools of CRM systems 130A-130Q and chat servers 140A-140P as is well known in the relevant arts.

Chat servers 140A-140P implement chat servers, which enable user interactions in natural language. Thus, each chat server receives inputs in natural language and generates outputs also in natural language. The generated outputs (in natural language) are forwarded to corresponding client systems.

CRM systems 130A-130Q represent conventional systems that formally complement the management of customer (end user) relationship. Each CRM system is typically used for maintaining identities and contact information of various customers (end users) and for managing customer interactions with respect to any purchases, subscriptions, problems or marketing efforts.

Custom service providers 145A-145S are publicly available web services that are accessible over the internet. Some of the exemplary custom service providers are weather prediction services, map services, etc.

The description is continued with respect to the manner in which an end user may use chat servers and a problem with such an approach.

3. Prior Approach

Figure 1B:
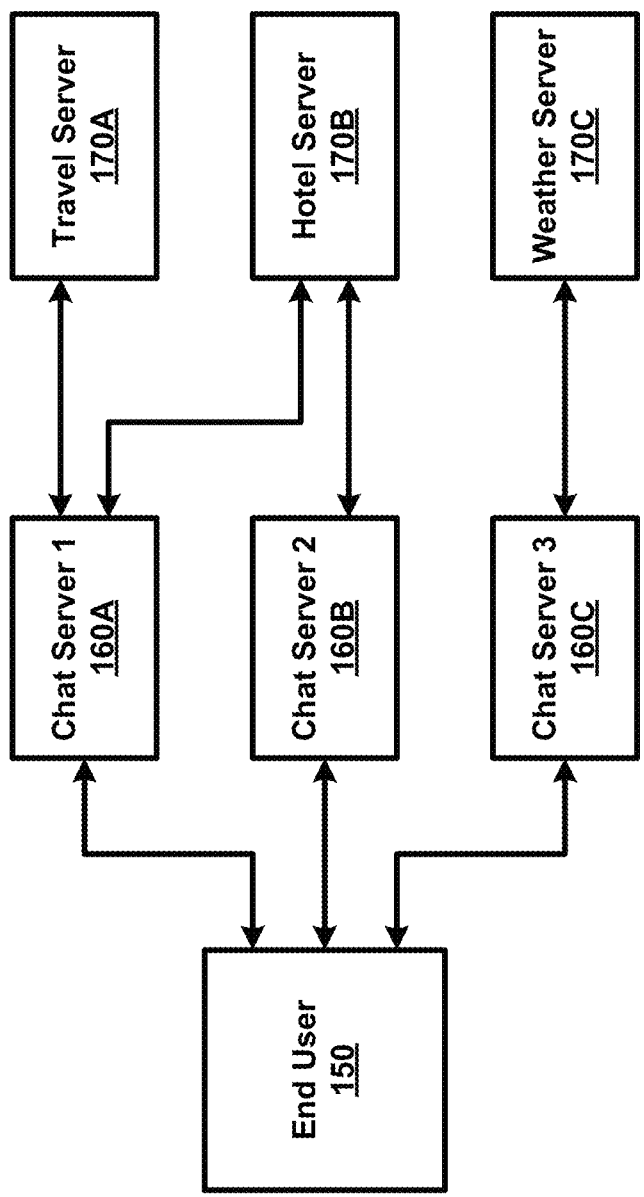
FIG. 1B is a block diagram illustrating a prior approach in which an end user interfaces with multiple chat servers.

FIG. 1B is a block diagram illustrating a prior approach in which an end user interfaces with multiple chat servers. The block diagram is shown as containing end user 150, chat servers 160A-160C and utility servers 170A-170C.

In the prior approach, a chat server is configured to interact with one or more utility servers and provide responses to end user 150 (from one of client systems 110A-110M). Utility servers are web applications providing services to end users. For instance, utility servers may include web applications providing travel booking services, hotel booking services, weather update services.

As an example, chat server 1 160A is shown interfacing with two utility servers namely travel server 170A and hotel server 170B. Accordingly, chat server 1 160A is configured to provide end user 150 at least with information on both travel booking and hotel booking services.

Similarly, chat server 2 160B is shown interfacing with one server namely hotel server 170B. Accordingly, chat server 2 160B is configured to provide end user 150 with only hotel booking services.

In a similar manner, chat server 3 160C is shown interfacing with one server namely weather server 170C. Therefore, chat server 3 160C is configured to provide end user 150 with only weather forecast services.

There are several challenges involved in such a prior approach. One challenge is that a single chat server configured to interface with one or more utility servers may not be able to cater to the requirements of the user. For example, chat server 1 160A provided by a vendor configured to interface with travel services and hotel services may not be able to cater to the requirement of providing weather forecast services. Similarly, chat server 3 160C provided by another vendor configured to interface with weather forecast server 170C may not be able to provide either hotel services or travel services. In other words, prior approach fails to provide a solution for integrating multiple chat servers provided by different vendors. Yet another challenge is that the prior approach lacks integration of chat servers with customer relationship management (CRM) application systems. Another challenge in the prior approach is the lack of integration between the chat servers. In other words, chat server 1 160A does not share any metadata with either chat server 2 160B and/or chat server 3 160C during a chat conversation and accordingly does not generate additional options that may be of interest to the user but not part of the user request.

Aspects of the present disclosure provide an approach to manage customer relationship using multiple chat servers designed to interface with service applications.

4. Block Diagram of an Example Embodiment

Figure 2:
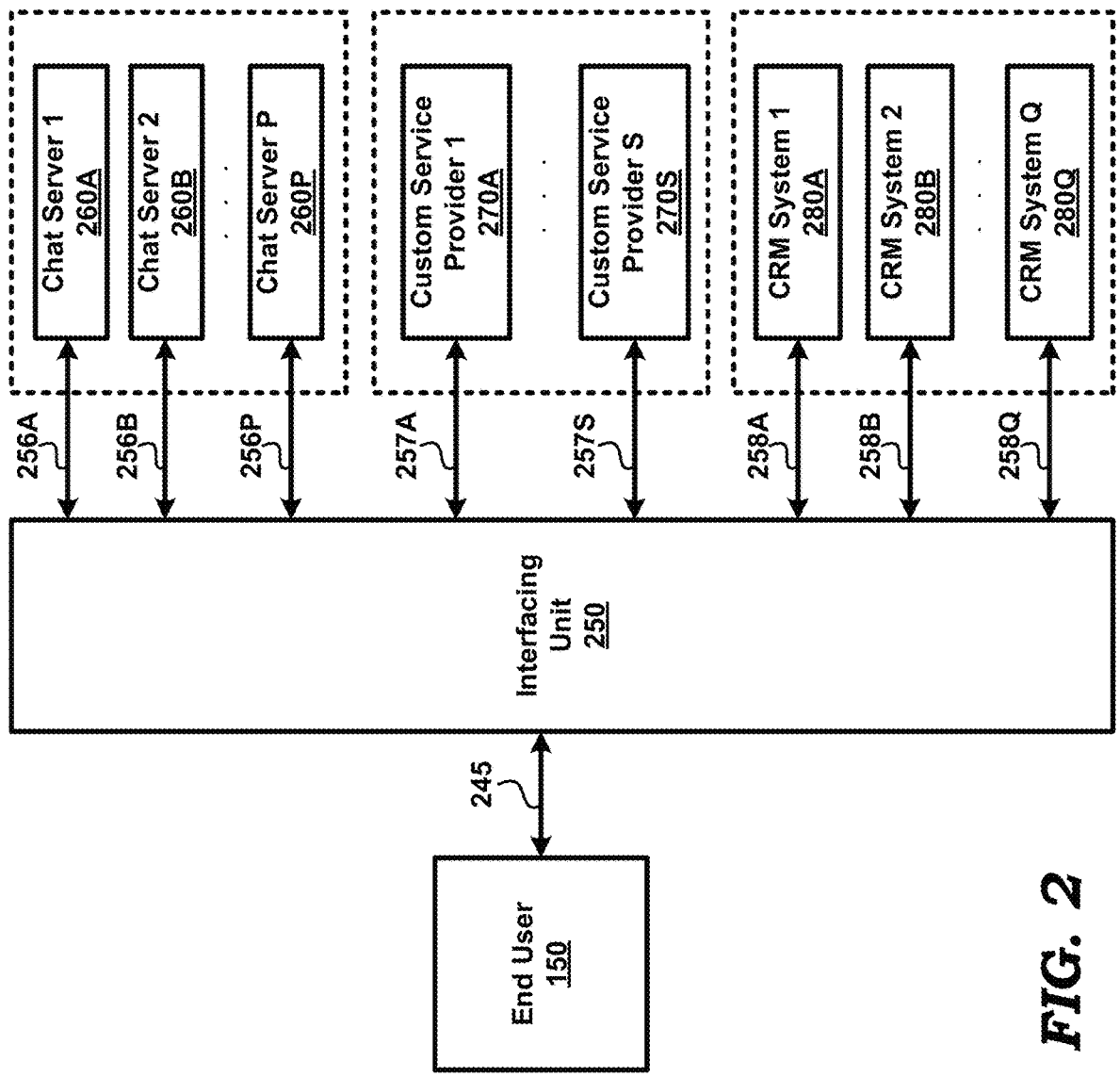
FIG. 2 is a block diagram illustrating some features of the present disclosure in an example embodiment.

FIG. 2 is a block diagram illustrating some features of the present disclosure in an example embodiment. The block diagram is shown containing end user 150, interfacing unit 250, chat servers 260A-260P, CRM systems 280A-280Q, and custom service providers 270A-270S.

End user 150 interacts with interfacing unit 250 using chat clients. Exemplary chat clients include Facebook Messenger™, Whatsapp™, Line™ and WeChat™. The interaction between end user 150 and interfacing unit 250 is a two-way communication as represented by 245.

Each of the chat servers 260A-260P may operate similar to chat servers 160A-160C, and interface with various services in the backend (though not shown). In other words, each chat server 260A-260P receives inputs in natural language on respective path 256A-256P, uses (invokes) the services provided by utility servers 170A-170C as appropriate, and generates responses on corresponding one of paths 256A-256P also in natural language. In the following description, each of chat servers 260A-260P is implemented as a chat bot (for example, DialogFlow product) or as an AI (Artificial Intelligence) enabled processing engine (for example, Clarifai application, well known in the relevant arts), and accordingly is capable of providing automated responses in natural language. In addition, each of chat servers 260A-260P is also capable of providing additional information ("intents", explained below) as part of the responses.

Though not shown, each chat server may be capable of providing chat sessions to end users directly, without the packet content traversing interfacing unit 250. The input/output interfacing may be akin to that with the packets received/sent on paths 256A-256P in such situations as well.

Each of the Custom Service Providers 270A-270S provides publicly available web services over the internet in a similar manner as that of Custom Service Providers 145A-145S. Each of the CRM systems 280A-280Q manages customer (end user) relationship in a similar manner as that of CRM systems 130A-130Q.

Interfacing unit 250 provided according to an aspect of the present disclosure, interfaces with more than one chat server (when needed) in providing responses to end user 150 in a single chat session. A single chat session is characterized by a sequence of messages (in either direction) displayed in a corresponding single window in a seamless manner (i.e., with the user not being required to take any action to switch between the chat servers). The sequence of messages depicts the user inputs and the corresponding responses (from chat servers) as in a conversation. Each message is assumed to be contained in one packet (with the corresponding TCP/IP headers).

Thus, interfacing unit 250 is able to take advantage of service capabilities of any of the chat servers in interacting with end users. Interfacing unit 250 may interact with chat server 3 having the interfacing ability with weather server 170C as well as chat server 1 having the interfacing ability with travel server 170A and hotel server 170B, for the purpose of providing a response on a single chat session to a single end user (client system). The problem(s) noted with respect to FIG. 1B above may be solved at least for such a reason.

Each user input can be a single message or a set of messages. In an embodiment, assuming user input to be a single message, the single message may be processed by multiple systems (for instance by any of chat servers 260A-260P, any of CRM systems 280A-280Q and/or any of custom service providers 270A-270S) to provide a response from the multiple systems. In other words, one or more chat servers, CRM systems and/or custom service providers can seamlessly process a single user input to generate respective messages, which are all provided as a response to the single user input.

In an embodiment, packets from client system 110A-110M are directed to interfacing unit 250 (in one direction), which in turn forwards the content to an appropriate chat server. Interfacing unit 250 constructs packets based on the message responses from the corresponding chat servers, and forwards such constructed packets back to the requesting client system (end user 150) in the reverse direction. The packets in the reverse direction originate at interface unit 250 (according to IP Protocol) and terminate at client system 110A-110M. However, alternative embodiments can be implemented using other approaches, as will be apparent to one skilled in the relevant arts by reading the disclosure provided herein.

In a further embodiment, the operation of interfacing unit 250 is controlled using administrator definable/configurable rules, which simplifies the integration of additional chat servers suitable in corresponding contexts. The description is continued with respect to such a rule based implementation of interfacing unit 250.

4. Rule Based Interfacing Unit

Figure 3:
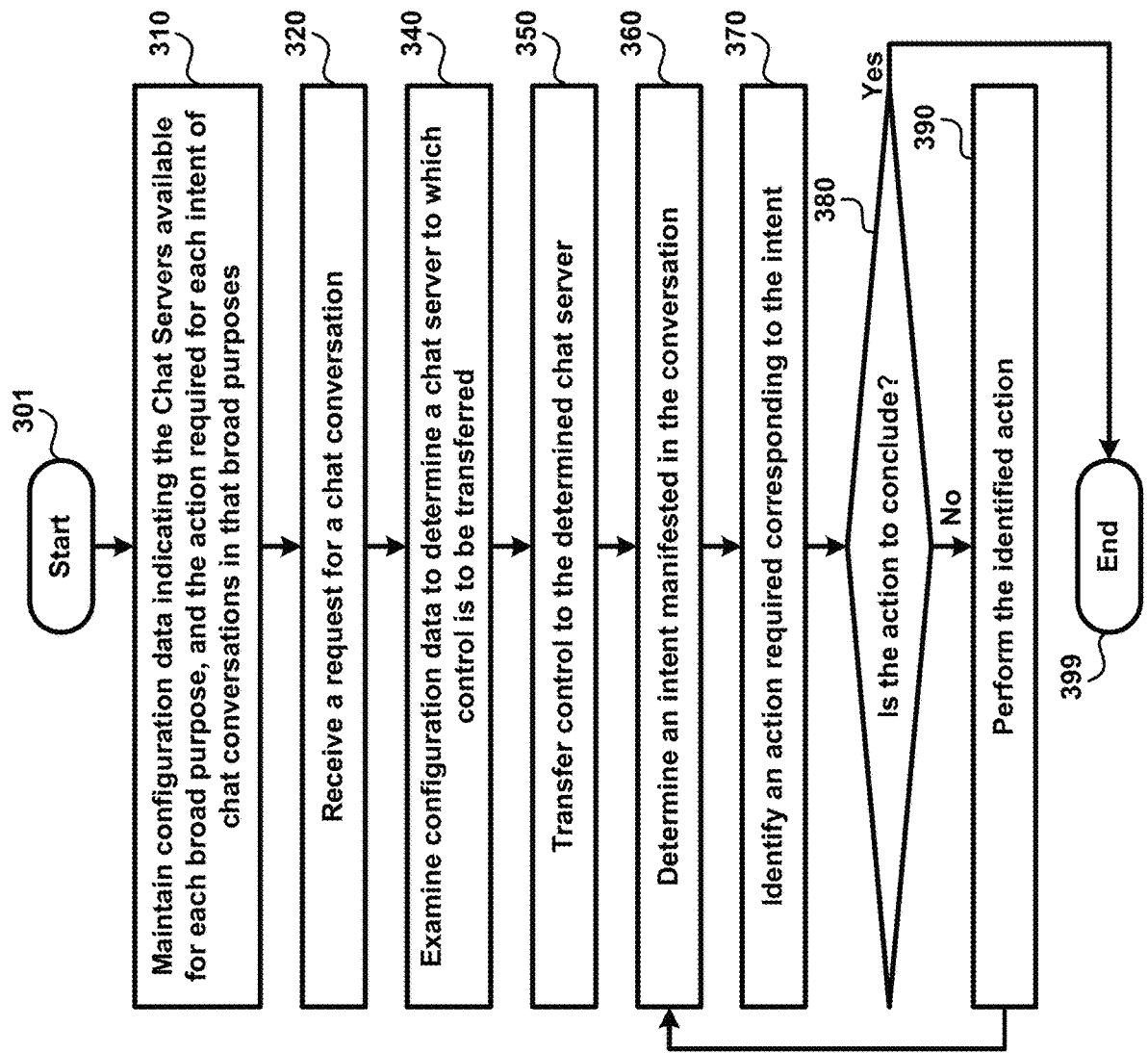
FIG. 3 is a flow chart illustrating the manner in which customer (end user) relationship is managed using multiple chat servers according to an aspect of the present disclosure.

FIG. 3 is a flow chart illustrating the manner in which customer relationship is managed using multiple chat servers (designed to interface with servers) according to an aspect of the present disclosure. The flowchart is described with respect to interfacing unit 250 and chat servers 260A-260P of FIG. 2 merely for illustration. However, many of the features can be implemented in other environments also without departing from the scope and spirit of several aspects of the present invention, as will be apparent to one skilled in the relevant arts by reading the disclosure provided herein.

The flow chart begins in step 301, in which control immediately passes to step 310. In step 310, interfacing unit 250 maintains configuration data indicating the chat servers available for each broad purpose, and the action that needs to be taken when a specific intent is identified for messages from end users in chat conversations in that broad purpose. A broad purpose refers to a broad service/utility (available from a single service provider) that may be of interest to end users. Each broad purpose may be travel booking purpose, hotel booking purpose, taxi booking purpose, etc. Each broad purpose is shown implemented by a corresponding utility server 170A-170C in FIG. 1B.

An intent represents an identifiable state of the chat conversation on which the end user is currently interfacing with chat servers (via interfacing unit 250). Based on the intent identified by interfacing unit 250, a corresponding action may be triggered. In an embodiment described below, the "intent" is determined by chat servers and communicated to interfacing unit 250. In the absence of intent communicated by chat servers 260A-260P, the intent is referred to as a 'blank intent' for the sake of brevity. The configuration data indicates the action required for each of such intents in the context of chats for corresponding purposes. The intent can be determined based on various approaches (implemented in chat servers, interfacing unit and/or external systems), even though the embodiment(s) described below rely on unique intent keys that are communicated from the chat servers for this purpose.

In step 320, interfacing unit 250 receives a request for a chat conversation from end user 150 in natural language. The request may specify a broad purpose as well. In step 340, interfacing unit 250 examines configuration data to determine an appropriate chat server to which the control is to be transferred. Interfacing unit 250 may accordingly choose one of the chat servers that is indicated in the configuration data as having the service capability corresponding to the broad purpose specified in the request.

In step 350, control is transferred to the determined chat server. Transferring control implies that interfacing unit 250 thereafter transfers each received input on the chat conversation to the determined chat server and receives the corresponding response. Interfacing unit 250 forwards each response of the chat conversation to the same client system (end user) from which the request is received.

In step 360, interfacing unit 250 determines an intent manifested in the conversation. The intent is determined by examining the requests/responses on the conversation. Technologies such as Artificial Intelligence (AI) may be used for such a purpose, even though embodiments described below depend on the intent states generated by the chat servers. Examples of intent are shown in the configuration data described in sections below.

In step 370, interfacing unit 250 identifies the action that needs to be taken when a specific intent is communicated based on the configuration data. The action is thereafter executed in steps 380 and 390 as described below.

In step 380, interfacing unit 250 checks whether the determined action is to conclude the conversation. In that case, control is transferred to step 399, in which the flowchart ends. Otherwise, control passes to step 390.

In step 390, interfacing unit 250 performs the identified action and then the control transfers to step 360. Such action can be to transfer control to some other chat server as well, which implies that the interfacing unit 250 is able to use as many different chat servers as needed in the same chat session (as experienced by the end user, typically in the corresponding single window established for the chat session). Similarly, as noted above, multiple messages can be generated (each from a different chat server) as a response to a single message, by appropriate choice of configuration data.

The features described above can be implemented using different approaches in corresponding embodiments. The description is continued with respect to the details of an example embodiment.

5. Example Internal Architecture of Interfacing Unit

FIG. 4 is a block diagram illustrating the details of interfacing unit 250 in an embodiment. Interfacing unit 250 is shown containing configuration data 405, main controller 410, logic controllers 440A-440X, helper modules 420A-420(P+Q), engine modules 460A-460(P+Q). Each block is described below in further detail.

Configuration data 405 may be stored in one or more files and controls the operation of interfacing unit 250. As will be clearer from the description below, the configuration data is editable and modifiable, to be able to add or delete chat servers or CRM systems (as well as alter operation with respect to individual systems) for any of the broad purposes.

Main controller 410 transfers packets received on an incoming chat session to one of the logic controllers 440A-440X (where X can be any positive integer) according to the configuration specified in configuration data 405. When a chat session is initially established, the session is allocated to one of the logic controllers (and to a specific chat server) according to the configuration data. Main controller 410 similarly receives packets from the allocated logic controller and forwards the packets to communications network 125 to cause the packet to be delivered to the corresponding client system. Main controller 410 accordingly maintains a chat session table indicating the logic controller and chat server to which a chat session is currently (at that point of time) allocated.

Main controller 410 also determines when a logic controller and/or chat server is to be changed for a session (prior to updating the chat session table), and orchestrates a change accordingly. In an embodiment, main controller 410 determines when/whether a change is required based on configuration data and current intent received associated with each response. When a change is determined to be necessary, main controller 410 forwards the current context of the chat session to each of logic controllers 440A-440X, which forward such context to respective chat servers. Such context may be sent as a meta data representing the material data exchanged on the chat session thus far.

The responses from each chat server may be examined to determine the most eligible chat server to be such a next chat server. In an embodiment, each response from a chat server indicates a 'weight' value, based on which the extent of eligibility is determined. A chat server from which the highest value is received, may be selected as the most eligible chat server. The chat session table may accordingly be updated to seamlessly continue interactions for the user with the newly selected chat server.

Logic controllers 440A-440X correspond to the X number of (different) broad purposes and implement any additional logic specific to the corresponding broad purpose. Thus, in the illustrative example, individual logic controllers may respectively be provided for travel, taxi, hotel, etc., reservations. In an embodiment, in case a logic controller has the choice of using more than one chat server for a given broad purpose, the logic controller determines the specific chat server or CRM system to use for the chat session and interfaces with the corresponding helper module for packets on that chat session.

Helper modules 420A-420(P+Q) facilitate inclusion of customized logic in interactions between logic controllers and engine modules. The routine customized functions may include any needed data conversions (e.g., XML to PDF, etc.) and wrapper functions that facilitate compatibility with prior versions, etc.

Each engine module 460A-460(P+Q) is designed to interface with a corresponding one of chat servers 260A-260P and CRM systems 280A-280Q. Each engine module may strip the packet headers from a network packet received from communication network 125, and append headers suitable for forwarding the resulting cloud packets to the corresponding chat server/CRM system. Each engine module may operate to provide any other packet/protocol compatibilities with the corresponding chat server/CRM system.

Similarly, when cloud packets are received from chat servers/CRM systems, the engine module repackages the received content in network packets suitable for delivery to corresponding client system. Accordingly, each engine module maintains a session mapping of TCP/IP session information on network 125 side and corresponding session information on cloud side, to implement the repackaging required in both directions.

In an embodiment, each chat server and CRM system responds back with a response content and intent for each input content of the user (forwarded to the chat server/CRM system). The intent also is passed to helper module for appropriate action according to aspects of the present disclosure. While the received intent is passed to helper module as a current intent, various techniques for determining such current intent, some based on persistence of state according to prior communication, will be apparent to one skilled in the relevant arts by reading the present disclosure. As noted above, the current intent is sent back to main controller 410, which determines the further actions with respect to the associated (network) packet, etc.

It may thus be appreciated that configuration data 405 controls many actions performed by interfacing unit 250. The description is accordingly continued with respect to sample configuration data in an example embodiment.

5. Sample Configuration Data

FIGS. 5A-5J together depict a sample configuration data implemented in the interface unit in one embodiment. The configuration data is according to JSON Format described in further detail in a document entitled, "RFC 8259: The JavaScript Object Notation (JSON) Data Interchange Format", by T. Bray of Internet Engineering Task Force (IETF).

Broadly, the sample configuration data is defined entailing only three broad purposes namely travel, hotel and taxi booking services, for illustration. Additional portions of configuration data as suited for corresponding environments will be apparent to one skilled in the relevant arts by reading the disclosure provided herein.

Broadly, blocks 510, 520, 528, 530, 540, 550 and 560 of FIGS. 5A-5G respectively relate to controlling communications to chat servers 260A-260C. Block 570 of FIG. 5H relates to interfacing with CRM systems 258A-258Q. Block 580 of Figure SI relates to interfacing with Custom Service Providers 270A-270S. Block 590 of FIG. 5J relates to various types of chat clients that can access interfacing unit 250 using client systems 110A-110M. Each of the blocks is described in detail below.

Block 510 of FIG. 5A indicates that the data portion relates to "Travel" purpose, and that there are two chat servers (travel.ai in sub-block 511 and image.ai in sub-block 512 of FIG. 5A) that can be used for Travel purpose. Sub-block 513 of FIG. 5A indicates a priority of 1, implying that travel module is to be used as the default module, compared to other modules with a higher priority number. Sub-block 514 indicates that "module1" logic controller (assumed to be Logic Controller 440A) can be invoked by main controller 410 for travel reservations purpose.

Each of the blocks 511 and 512 of FIG. 5A contains text indicating the name, description (the input format), application id, userid/password for the respective engine module to login and use the services provided by the chat server, the identifier of block for 'intents' expressed in the corresponding chat conversation, and the URL at which the chat server is deemed to be accessed by the chat clients.

The input format in block 511 of FIG. 5A is shown to be nlp (natural language processing), while the input format in block 512 of FIG. 5A is shown to be image. Lines 515 and 516 of FIG. 5A respectively indicate the intents to be defined in sub-modules labeled as "intents_1" (for travel.ai) and "intents_2" (for image.ai). The two sub-modules are shown as blocks 530 of FIG. 5D and 540 of FIG. 5E respectively.

Block 530 of FIG. 5D corresponding to "intents_1" (of line 515) is shown containing five intents depicted in sub-blocks 531-535 of FIG. 5D respectively. Each sub-block is shown containing header unique intent key (which is required to match the incoming intent from the chat server for the sub-block to be applicable), "name" of the function in the logic controller to be invoked, and weight. The weight is used as a threshold number (e.g., only if the received weight exceeds the stated weight) for invoking the named function.

Thus sub-block 531 is shown with header unique intent key of "START_INTENT", 'start' as the function to be invoked within the "intents_1" file (as indicated by line 515), and 0.7 as the weight. The remaining sub-blocks 532-535 of block 530, sub-blocks 541-542 of block 540, sub-blocks of blocks 550 and 560 are similarly explained. Block 520 of FIG. 5B and sub-blocks 521-524 of FIG. 5B are explained similar to above and the description is not repeated in the interest of conciseness.

Continuing with respect to block 570 and 580 of FIGS. 5H and 5I respectively, sub-block 571 of FIG. 5H depicts the CRM system that can be used for travel purpose, and sub-block 572 of FIG. 5H depicts the CRM system that can be used for hotel purpose. Each of the sub-blocks is shown containing the name, description, applicationid, userid/password combination (to be used for logging-in).

Block 580 of Figure SI contains two sub-blocks 581 and 582 respectively showing the manner in which messages can be posted to and retrieved from Custom Service Providers (for example Custom Service Providers 270A and 270B) using REST/SOAP architecture.

Block 590 of FIG. 5J contains two sub-blocks 591 and 592 for Acme and Beta as the text and voice chat clients respectively. Sub-block 591 indicates that the text chat client is to be provided as part of the Acme website/web pages. Each sub-block also indicates the credential/end point details necessary to communicate with the chat client.

The manner in which such configuration data is used in the architecture described above, is explained below with an example.

6. Sample Transactions of a Single Chat Session

Figure 6A:
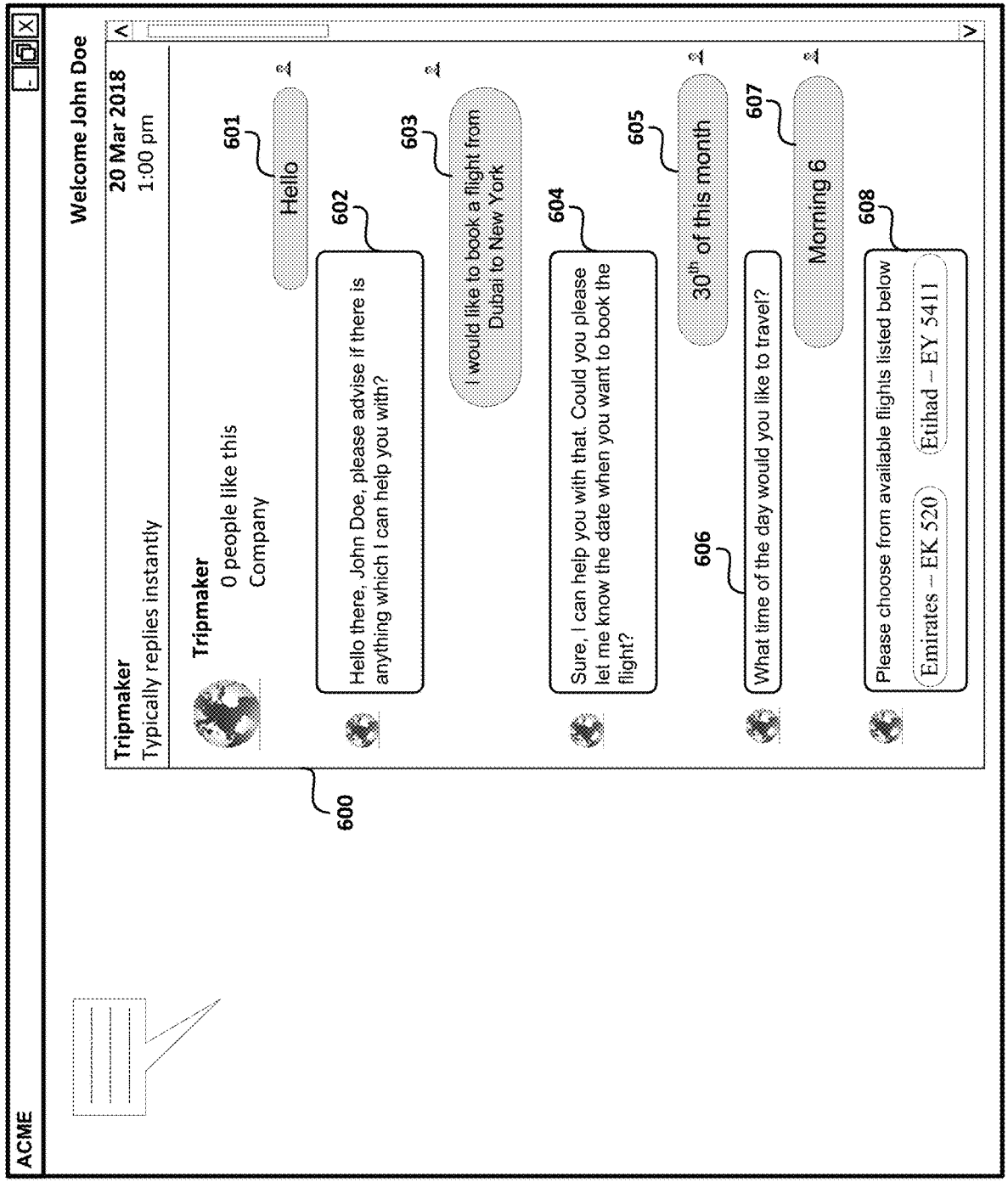
FIGS. 6A-6C depict sample user interfaces in one embodiment of the present disclosure.
Figure 6B:
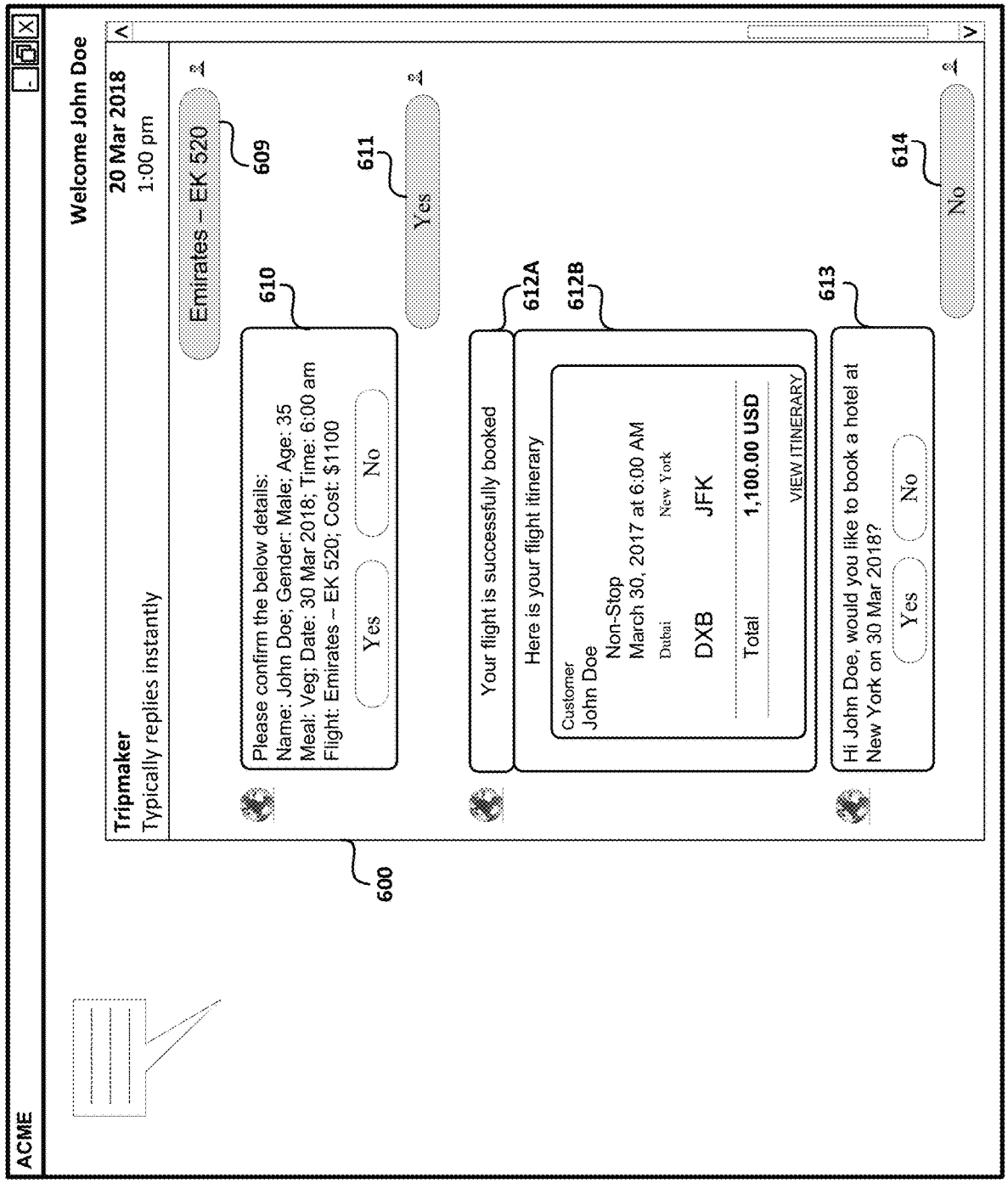
Figure 6C:
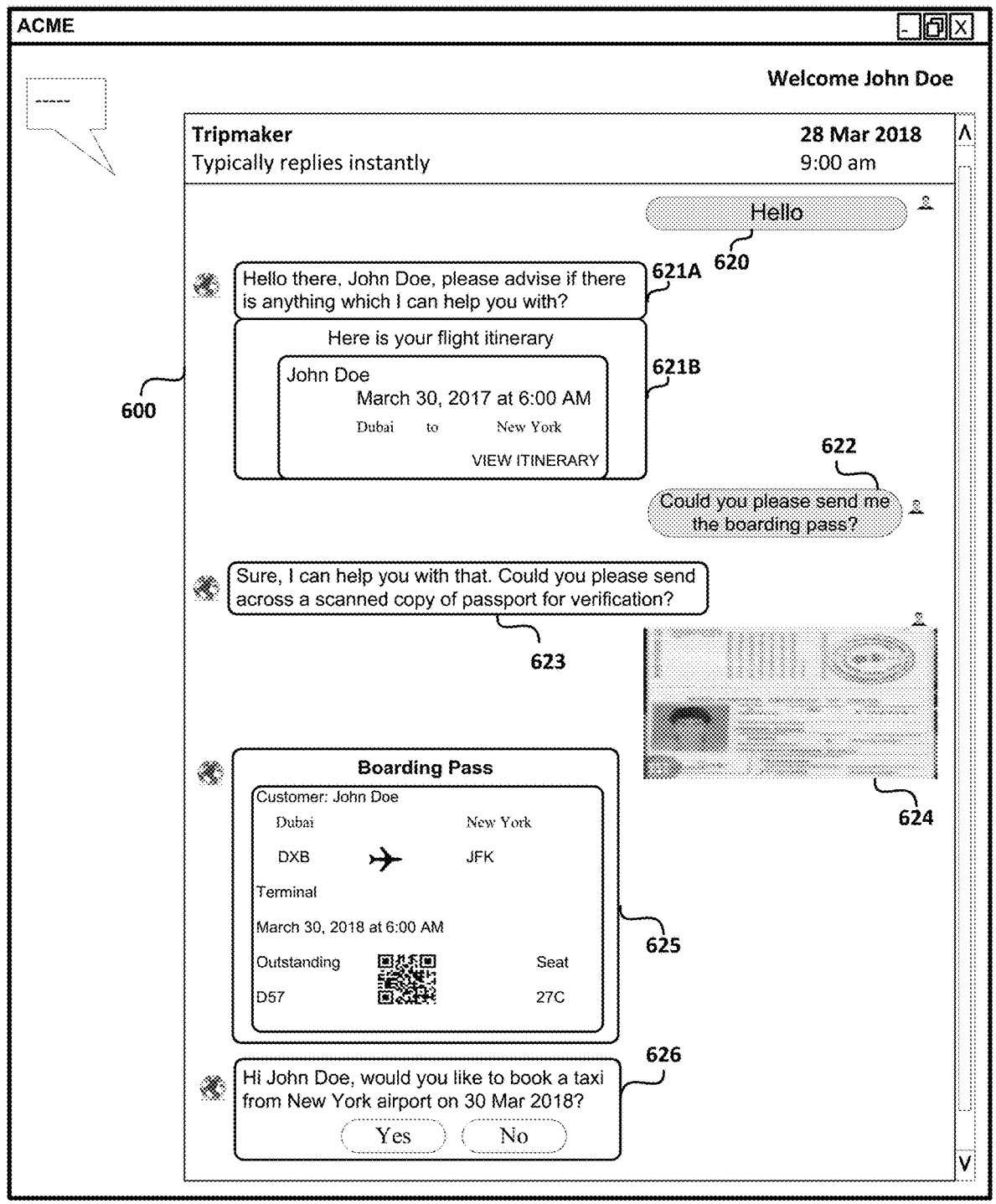

FIGS. 6A-6C depict sample user interfaces provided in an example of the present disclosure. While FIGS. 6A and 6B depicts user interfaces provided as part of a chat session at 20 Mar. 2018, FIG. 6C depicts a user interface provided as part of another chat session at 28 Mar. 2018.

In the example corresponding to FIGS. 6A and 6B, an end user at client system 110A is shown booking a travel ticket and thereafter seamlessly provided with an option to book a hotel using different chat servers according to aspects of the present disclosure. For example, in the Acme website shown in FIGS. 6A-6C, when the end user clicks (though not shown) on the icon/link, the end user is displayed with chat client window display 600. Acme chat client window 600 contains the display of all messages to and from the end user.

Figure 7A:
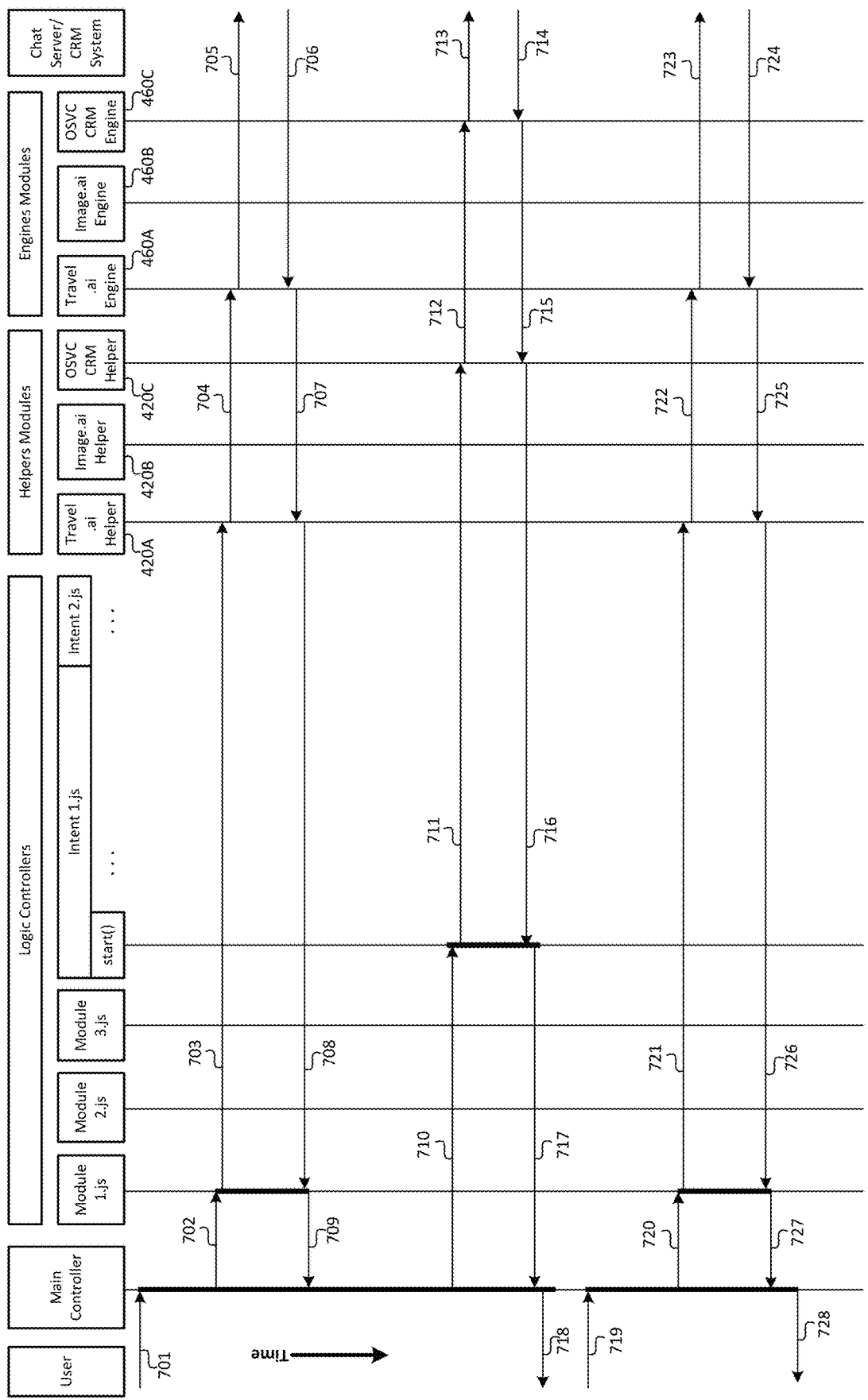
FIG. 7A-7C depicts events at each stage corresponding to the user interface experience of FIGS. 6A-6C.
Figure 7B:
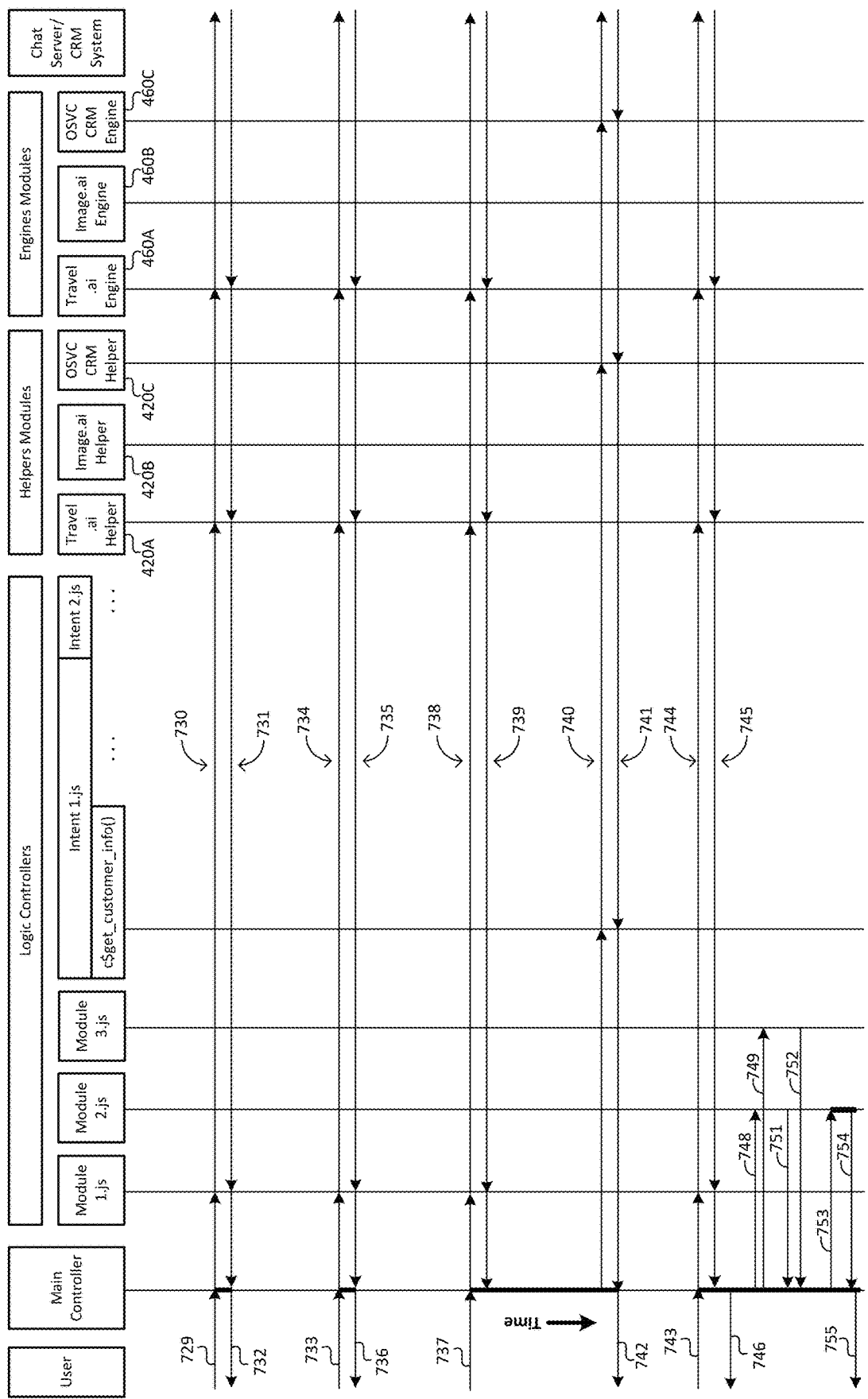
Figure 7C:
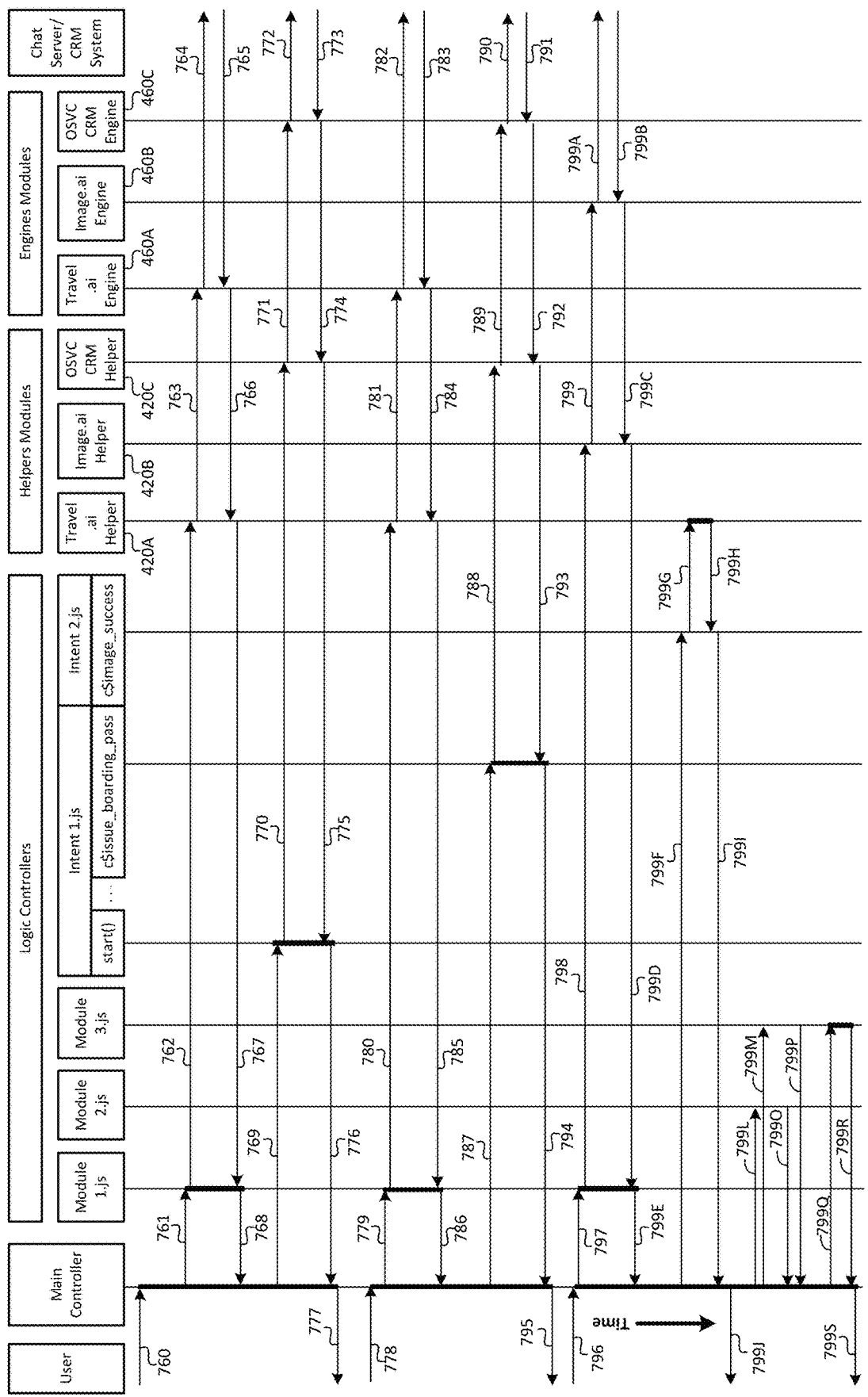

FIGS. 7A and 7B depict the events at each stage corresponding to the user interface experience of FIGS. 6A and 6B. FIG. 7C depicts the events at each stage corresponding to the user interface experience of FIG. 6C.

FIGS. 7A-7C are shown with various files/modules that are shown invoked in the configuration data of FIGS. 5A-5K, and also some of the internal executable modules implemented within the various modules. Modules of Logic controllers 440A-440X are shown implemented as .js files. For example, module 1 and intent 1 of logic Controller 1 440A are shown implemented respectively as module1.js and intent1.js in FIGS. 7A-7C. Helper modules (Travel.ai Helper 420A, Image.ai Helper 420B and OSVC CRM Helper 420C) are implemented as classes in java script. Engine modules (Travel.ai Engine 460A, Image.ai Engine 460B and OSVC CRM Engine 460C) may be implemented in the form of Javascript libraries, Java™ Archive (JAR) files, other programming languages, etc.

At 601 the end user from an Acme chat client is shown to have entered "Hello", which is represented as event 701 to main controller 410. Responsive thereto, main controller 410 is shown to have invoked module1.js (in view of main controller 410 parsing sub-block 514) of logic controller 1 440A at 702 to process the network packet/content. In view of sub-block 591, main controller 410 triggers the process to fetch the customerId from the request body in the network packet header.

Main controller 410 updates an internal chat session table to indicate that the current chat session is allocated to logic controller 1 440A. Event 703 depicts invocation of Travel.ai Helper 420A (selected according to implementation of logic controller 1 440A), which in turn is shown invoking Travel.ai Engine 460A in event 704 to process the network packet.

The Travel.ai Engine 460A strips the headers of the network packet, and the packet content (including "Hello") is encapsulated consistent with the requirements of chat server 260A. The Travel.ai Engine examines the configuration data if needed to fetch the URL, user name and password (sub-block 511) and sends the encapsulated packet (cloud packet) to chat server 260A corresponding to Travel.ai Helper 420A at event 705. To enable reconstruction of network packets in the reverse direction, engine modules update the session mapping.

At 706, chat server 260A is shown to examine the encapsulated packet and forward a response (communicates an intent) assumed to represent the text, "Hello there, please advise if there is anything which I can help you with" along with the intent "+START_INTENT" to Travel.ai Engine 460A.

At event 707, Travel.ai Engine 460A encapsulates the response (along with the "+START_INTENT") of chat server 260A consistent with the requirements of Travel.ai Helper 420A. Thereafter, Travel.ai Engine 460A forwards the encapsulated response packet to Travel.ai Helper 420A using the session mapping. At event 708, Travel.ai Helper forwards the encapsulated response packet to the module1.js of logic controller 1 440A.

Module.js/intent.js of logic controllers appends a contextual data to the encapsulated response packet received from Helper modules. Contextual data indicates the module of logic controllers and the Engine that processed the response packet. At 709, module1.js of logic controller 1 440A appends a contextual data to the encapsulated response packet indicating that the encapsulated response packet was processed by module1 and Travel.ai Engine. Thereafter, the appended response packet is forwarded to the main controller 410.

Main controller 410 identifies the intent in the appended response packet. Thereafter, main controller truncates the intent and contextual data, invokes appropriate procedure in intent.js (of corresponding logic controller, selected according to the configuration data and based on the contextual data) and forwards the appended response along with the data fetched at event 702 to the appropriate procedure.

At 710, main controller identifies the intent "START_INTENT" in the appended response packet and truncates the intent. In view of the contextual data in the appended response packet, main controller 410 is aware that the truncated response packet was processed by Travel.ai Engine and module1. After truncating the contextual data, main controller 410 parses lines 515 (of sub-block 511). The configuration data therein indicates the main controller to parse sub-block 531 (of block 530) to determine procedure 'start' of intent1.js to be invoked next. Accordingly, main controller 410 forwards the truncated response packet along with customerID (fetched at 702) to 'start' of intent1.js (of logic controller 1 440A).

Responsive thereto, event 711 depicts invocation of Osvc CRM Helper 420C (selected according to implementation of logic controller 1 440A), which inturn is shown invoking Osvc CRM Engine 460C at 712 to process the identified intent.

Each of the engines and helpers encapsulates and reconstructs the network packets or response packets in a manner suitable for the corresponding chat servers/CRM systems as described above. The encapsulation of network packets and reconstruction of the response packets are not repeated for conciseness.

At 713, Osvc CRM Engine 460C examines the configuration data if needed to fetch the URL, username and password (sub-block 571) and interfaces with CRM system 1 280A. Thereafter, Osvc CRM Engine 460C sends the truncated response packet to CRM system 1 280A.

At 714, CRM system 1 280A forwards a response (containing details of end user retrieved from CRM system 1 280A based on the customerId fetched at 702) to the Osvc CRM Engine 460C.

At 715, Osvc CRM Engine 460C forwards the response from CRM system 1 280A to Osvc CRM Helper 420C, which inturn forwards to 'start' of intent1.js (of logic controller 1 440A) at event 716.

At 717, 'start' of intent1.js (of logic controller 1 440A) extracts name (for example, John Doe") of the end user from the response from CRM system 1 280A and constructs the greeting message to be sent to the end user. Thereafter, 'start' of intent1.js (of logic controller 1 440A) sends the constructed response message to main controller 410.

At event 718, main controller 410 forwards the reconstructed response message to the corresponding Acme chat client associated with the end user. Accordingly, the reconstructed response message "Hello there, John Doe, please advise if there is anything which I can help you with?" is displayed at 602 on the Acme chat client window of the end user.

In response thereto, at 603, the user is shown to have entered "I would like to book a flight from Dubai to New York", which is represented as event 719 to main controller 410.

At event 720, main controller 410 is shown to have invoked module1.js (in view of main controller 410 parsing sub-block 514) of logic controller 1 440A to process the new network packet/content.

Event 721 depicts invocation of Travel.ai Helper 420A (selected according to implementation of logic controller 1

440A), which in turn is shown invoking Travel.ai Engine 460A at 722 to encapsulate the new network packet.

Travel.ai Engine 460A examines the configuration data if needed to fetch the URL, user name and password (sub-block 511) and sends the encapsulated packet (cloud packet) to chat server 260A corresponding to helper module 420A at event 723.

At 724, chat server 260A is shown to examine the encapsulated packet and forward a response assumed to represent the text, "Sure, I can help you with that. Could you please let me know the date when you want to book the flight?" to Travel.ai Engine 460A with no intent appended to the response.

At event 725, Travel.ai Engine 460A encapsulates the response of chat server 260A consistent with the requirements of Travel.ai Helper 420A. Thereafter, Travel.ai Engine 460A forwards the encapsulated response packet to Travel.ai Helper 420A.

At event 726, Travel.ai Helper forwards the encapsulated response packet to the module1.js of logic controller 1 440A.

At 727, module1.js of logic controller 1 440A forwards the encapsulated response packet to the main controller 410.

At 728, main controller 410 identifies that there is no intent appended to the encapsulated response packet and therefore passes the encapsulated packet to the corresponding Acme chat client associated with the end user. Accordingly, the encapsulated response message "Sure, I can help you with that. Could you please let me know the date when you want to book the flight?" is displayed at 604 on the Acme chat client window of the end user.

In response thereto, at 605, the user is shown to have entered "30$^{th}$ of this month", which is represented as event 729 to main controller 410.

Event 730 is represented as events similar to events 720-723. In a similar manner, event 731 is represented as events similar to events 724-727. At 731, chat server 260A forwards a response assumed to represent the text, "What time of the day would you like to travel?" with no intent appended to the response.

At 732, main controller 410 identifies that there is no intent appended to the encapsulated response packet and accordingly, the encapsulated response message "What time of the day would you like to travel?" is displayed at 606 on the Acme chat client window of the end user.

Responsive thereto, at 607, the user is shown to have entered "Morning 6", which is represented as event 733 to main controller 410.

Event 734 is similar to event 730. In a similar manner, event 735 is similar to event 731. At 731, chat server 260A forwards a response assumed to represent the text, "Please choose from the available flights listed below: 'Emirates—EK 520' 'Etihad—EY 5411'" with no intent appended to the response.

At 736, main controller 410 identifies that there is no intent appended to the encapsulated response packet and accordingly, the encapsulated response message "Please choose from the available flights listed below: 'Emirates—EK 520' 'Etihad—EY 5411'" is displayed at 608 on the Acme chat client window of the end user.

Responsive thereto, end user chooses one flight from the available list and at 609, the user is shown to have chosen "Emirates—EK 520", which is represented as event 737 to main controller 410.

In response thereto, main controller 410 is shown to have invoked module1.js (in view of main controller 410 parsing sub-block 514) of logic controller 1 440A at 738 to process the network packet/content. Furthermore, at 738, the network packet is forwarded to module1.js of logic controller 1 440A and then to chat server 260A via Travel.ai Helper 420A and Travel.ai Engine 460A.

At event 739, chat server 260A is shown to examine the encapsulated packet and forward a response assumed to represent the text "Please confirm the below details: Date: 30 Mar. 2018; Time: 6:00 AM; Flight: Emirates—EK 520; Cost: 1100. Yes or No" along with the intent "GET_CUSTOMER_PREFERENCE" to Travel.ai Engine 460A. The encapsulated response packet is forwarded to module1.js of logic controller 1 440A via Travel.ai Helper 420A. Furthermore, module1.js of logic controller 1 440A appends a contextual data to the encapsulated response packet indicating that the encapsulated response packet was processed by module1 and Travel.ai Engine 460A. Thereafter, the appended response packet is forwarded to the main controller 410.

At 740, main controller identifies the intent "GET_CUSTOMER_PREFERENCE" in the appended response packet and truncates the intent from the received packet. In view of the contextual data in the appended response packet, main controller 410 is aware that the truncated response packet was processed by Travel.ai Engine 460A and module1. Accordingly, main controller 410 parses lines 515 (of sub-block 511). The configuration data therein indicates the main controller to parse sub-block 534 (of block 530) to determine procedure 'c$get_customer_info' of intent1.js to be invoked next. Accordingly, main controller 410 forwards the truncated response packet along with customerID (fetched at 702) to procedure 'c$get_customer_info' of intent1.js (of logic controller 1 440A).

Responsive thereto, furthermore event 740 depicts invocation of Osvc CRM Helper 420C (selected according to implementation of logic controller 1 440A), which inturn is shown invoking Osvc CRM Engine 460C to process the identified intent. Osvc CRM Engine 460C examines the configuration data if needed to fetch the URL, username and password (sub-block 571) and interfaces with CRM system 1 280A. Thereafter, Osvc CRM Engine 460C sends the truncated response packet to CRM system 1 280A.

At 741, CRM system 1 280A forwards a response (containing name, age, gender, meal preference of end user retrieved from CRM system 1 280A based on the customerId fetched at 702) to the Osvc CRM Engine 460C. Osvc CRM Engine 460C forwards the response from CRM system 1 280A to Osvc CRM Helper 420C, which inturn forwards to 'c$get_customer_info' of intent1.js (of logic controller 1 440A). In response thereto, 'c$get_customer_info' of intent1.js (of logic controller 1 440A) extracts name, age, gender, meal preference (for example, John Doe, 35 years, Male, Veg respectively) of the end user from the response from CRM system 1 280A and constructs the confirmation message to be sent to the end user. Thereafter, 'c$get_customer_info' of intent1.js (of logic controller 1 440A) sends the constructed response message to main controller 410.

At event 742, main controller 410 forwards the reconstructed response message to the corresponding Acme chat client associated with the end user. Accordingly, the reconstructed response message "Please confirm the below details: Name: John Doe; Age: 35 years; Gender: Male; Meal: Veg; Date: 30 Mar. 2018; Time: 6:00 AM; Flight: Emirates—EK 520; Cost: $1100. Yes or No" is displayed at 610 on the Acme chat client window of the end user.

Responsive thereto, at 611, end user is shown to have confirmed the details by choosing 'Yes', which is represented as event 743 to main controller 410.

In response thereto, at 744, main controller 410 is shown to have invoked module1.js (in view of main controller 410 parsing sub-block 514) of logic controller 1 440A and module1.js forwards the network packet (confirmation message 'Yes') to chat server 260A via Travel.ai Helper 420A and Travel.ai Engine 460A.

Event 745 is similar to event 739. At event 745, chat server 260A is shown to examine the encapsulated packet and to book a flight according to the details confirmed at 611. Thereafter, chat server 260A forwards to Travel.ai Engine 460A, a response assumed to represent the text "Your flight is successfully booked. Here is your flight itinerary" along with all the details of the booked flight and an intent "POSITIVE_END_INTENT" appended. The appended response packet is further forwarded to Travel.ai Helper 420A and then to main controller 410 via module1.js of logic controller 1 440A.

At event 746, main controller 410 reconstructs the response message to display the flight itinerary and forwards the reconstructed response message to the corresponding Acme chat client associated with the end user. Accordingly, the reconstructed response message "Your flight is successfully booked" and "Here is your flight itinerary" is displayed at 612A and 612B respectively on the Acme chat client window of the end user.

When main controller 410 identifies a "POSITIVE_END_INTENT", then main controller broadcasts metadata (indicating the updated status of the tasks completed in a particular module of a logic controller 440A, in this example) to corresponding modules of remaining logic controllers 440B-440X. For illustration, it is assumed that the remaining logic controllers are 440B and 440C.

At events 748 and 749, main controller 410 is shown broadcasting metadata (indicating completion of flight booking task in module 1 of logic controller 440A) to corresponding modules of remaining logic controllers 440B and 440C, in view of "POSITIVE_END_INTENT" appended at event 745. In this example, metadata may include the place of origin and destination, time of flight, flight name, details of end user (name, age), etc., with appropriate tags according to any pre-specified convention. At event 748, module2.js of logic controller 2 440B determines if a hotel can be booked. At event 749, module3.js of logic controller 3 440C determines if a taxi can be booked.

Responsive to the broadcast of metadata, based on determination at events 748 and 749, each of the logic controllers 440B and 440C sends a confidence level at events 751 and 752 respectively. Confidence level may be any number between 0 and 1 (both inclusive). In this example, current date of transaction is shown as 20 Mar. 2018 (10 days before the date of flight travel). Accordingly, logic controller 2 440B sends a confidence level of 0.8 (since hotel can be booked 10 days before the date of flight travel) and logic controller 3 440C sends a confidence level of 0.4 (since taxi can be booked later even on the date of flight travel). Therefore, hotel reservation (manifested in module 2.js of logic controller 2 440B) might be next most eligible transaction for the current transaction.

Main controller 410 chooses the logic controller with the highest confidence level/highest priority or a combination of both as the next most eligible logic controller. Accordingly, main controller 410 updates the internal chat session table to indicate that the current chat session is allocated to the most eligible logic controller.

Main controller 410 determines that module 2.js of logic controller 2 440B has sent a confidence level that is highest among those sent by corresponding modules of remaining logic controllers 440B-440X.

In response thereto, main controller 410 updates the internal chat session table to indicate that the current chat session is allocated to logic controller 2 440B for hotel reservation purpose.

At event 753, main controller 410 invokes module 2.js of logic controller 2 440B (in view of highest confidence level sent by logic controller 2 440B). Responsive thereto, Hotel.ai Helper 420D (not shown in FIGS. 7A-7C) is invoked (selected according to implementation of logic controller 2 440B), which in turn invokes Hotel.ai Engine 460D (not shown in FIGS. 7A-7C). Hotel.ai Engine 460D examines the configuration data if needed to fetch the URL, user name and password (sub-block 521) and sends the encapsulated packet (cloud packet) to chat server 260C corresponding to Hotel.ai Helper 420D. Chat server 260C is shown to examine the broadcasted metadata and forwards a response assumed to represent the text, "Hi John Doe, would you like to book a hotel at New York on 30 Mar. 2018? Yes or No".

The events between module2.js, Hotel.ai Helper 420D, Hotel.ai Engine 460D and chat server 260C are not shown in FIG. 7B and are similar to interactions with respect to module1.js as explained above. The response packet is forwarded to main controller 410 at event 754. The generated response packet is forwarded to end user at event 755 which is displayed at 613 on the Acme chat client window of the end user.

It may thus be appreciated that messages 612B and 613 from chat servers 260A and 260C respectively are displayed as a response to input 611 provided by the end user in FIG. 6B.

The user is shown to choose "No" at 614 and accordingly, the chat session ends at that point with no control to modules/intents of logic controller 2 440B.

If the user chooses "Yes", corresponding modules/intents of logic controller 2 440B are invoked in accordance with block 520 of FIG. 5B. The corresponding operation will be apparent to a skilled practitioner by reading the disclosure herein.

It may thus be appreciated that all the transactions described above with respect to FIGS. 6A-6B are performed in a single chat session, implying the user experience is in the same window as depicted there, and the corresponding packets exchanged would also reflect the continuum.

In another example corresponding to FIG. 6C, an end user at client system 110A is shown generating a boarding pass (having passport verified) and thereafter seamlessly booking a taxi using different chat servers according to aspects of the present disclosure.

At 620 the end user from an Acme chat client is shown to have entered "Hello", which is represented as event 760 to main controller 410. Events 761-776 are similar to events 702-717.

At event 777, the reconstructed response message "Hello there, John Doe, please advise if there is anything which I can help you with?" and the flight itinerary is displayed at 621A and 621B respectively on the Acme chat client window of the end user. Here, the response from Travel.ai includes the flight itinerary of the end user displayed at 612B.

In response thereto, at 622, the user is shown to have entered "Could you please send me the boarding pass?", which is represented as event 778 to main controller 410.

Events 779-782 are similar to events 702-705. At 783, chat server 260A is shown to examine the encapsulated packet and forward a response assumed to represent the text, "Sure, I can help you with that. Could you please send across a scanned copy of passport for verification?" along with the intent "+ISSUE_BOARDING_PASS" (example unique intent key) to Travel.ai Engine 460A. Events 784-786 are similar to events 707-709.

At event 787, main controller identifies the intent "ISSUE_BOARDING_PASS" in the appended response packet and truncates the intent. In view of the contextual data in the appended response packet, main controller 410 is aware that the truncated response packet was processed by Travel.ai Engine and module1. After truncating the contextual data, main controller 410 parses lines 515 (of sub-block 511). The configuration data therein indicates the main controller to parse sub-block 535 (of block 530) to determine procedure 'c$issue_boarding_pass' of intent1.js to be invoked next. Accordingly, main controller 410 forwards the truncated response packet along with customerID (fetched at 702) to 'c$issue_boarding_pass' of intent1.js (of logic controller 1 440A).

Responsive thereto, event 788 depicts invocation of Osvc CRM Helper 420C (selected according to implementation of logic controller 1 440A), which inturn is shown invoking Osvc CRM Engine 460C at 789 to process the identified intent.

At 790, Osvc CRM Engine 460C examines the configuration data if needed to fetch the URL, username and password (sub-block 571) and interfaces with CRM system 1 280A. Thereafter, Osvc CRM Engine 460C sends the truncated response packet to CRM system 1 280A.

At 791, CRM system 1 280A forwards a response (containing details of passport, if any, of end user retrieved from CRM system 1 280A based on the customerId fetched at 702) to the Osvc CRM Engine 460C.

At 792, Osvc CRM Engine 460C forwards the response from CRM system 1 280A to Osvc CRM Helper 420C, which inturn forwards to 'c$issue_boarding_pass' of intent1.js (of logic controller 1 440A) at event 793.

At 794, 'c$issue_boarding_pass' of intent1.js (of logic controller 1 440A) extracts details of passport of the end user from the response from CRM system 1 280A and forwards the extracted passport details (if any) to main controller 410.

The description is continued with the assumption that CRM system 1 280A does not contain the passport details of the end user.

At event 795, main controller 410 forwards the truncated response packet to the corresponding Acme chat client associated with the end user. Accordingly, the reconstructed response message "Sure, I can help you with that. Could you please send across a scanned copy of passport for verification?" is displayed at 623 on the Acme chat client window of the end user.

In response thereto, at 624, the user is shown to have uploaded an image file (for example, a copy of his passport) which is represented as event 796 to main controller 410.

Responsive thereto, main controller 410 is shown to have invoked module1.js (in view of main controller 410 parsing sub-block 514) of logic controller 1 440A at 797 to process the network packet/content.

Module.js of logic controllers 440A-440X are implemented to select corresponding Helper modules 420A-420(P+Q) and Engine modules 460A-460(P+Q) according to the input type. For example, if the input type is image, then module1.js of logic controller 1 440A invokes Image.ai Helper 420B; whereas if the input type is text, then module1.js of logic controller 1 440A invokes Travel.ai Helper 420A.

Event 798 depicts invocation of Image.ai Helper 420B (selected according to image input type at 624/event 796), which in turn is shown invoking Image.ai Engine 460B at 799 to process the network packet.

At 799A, Image.ai Engine 460B examines the configuration data if needed to fetch the URL, user name and password (sub-block 512) and sends the encapsulated packet (cloud packet) to chat server 260B corresponding to Image.ai Helper 420B.

At event 799B, chat server 260B is shown to examine the encapsulated packet and forward a response along with a corresponding intent to Image.ai Engine 460B. The description is continued assuming that the end user has uploaded an authentic passport copy. Accordingly, chat server 260B generates and sends boarding pass along with the intent "+POSITIVE_END_INTENT" to Image.ai Engine 460B.

At event 799C, Image.ai Engine 460B encapsulates the response (along with the "+POSITIVE_END_INTENT") of chat server 260B consistent with the requirements of Image.ai Helper 420B. Thereafter, Image.ai Engine 460B forwards the encapsulated response packet to Image.ai Helper 420B using the session mapping.

At event 799D, Image.ai Helper 420B forwards the encapsulated response packet to module1.js of logic controller 1 440A.

At 799E, module1.js of logic controller 1 440A appends a contextual data to the encapsulated response packet indicating that the encapsulated response packet was processed by module1 and Image.ai Engine. Thereafter, the appended response packet is forwarded to the main controller 410.

At 799F, main controller 410 identifies the intent "POSITIVE_END_INTENT" in the appended response packet and truncates the intent. In view of the contextual data in the appended response packet, main controller 410 is aware that the truncated response packet was processed by Image.ai Engine 460B and module1. After truncating the contextual data, main controller 410 parses lines 516 (of sub-block 512). The configuration data therein indicates the main controller to parse sub-block 541 (of block 540) to determine procedure 'c$image_success' of intent2.js to be invoked next. Accordingly, main controller 410 forwards the truncated response packet to 'c$image_success' of intent2.js (of logic controller 1 440A).

Event 799G depicts truncated response being forwarded to Travel.ai Helper 420A for further processing.

At event 799H, Travel.ai Helper 420A reconstructs the boarding pass corresponding to the details displayed at 621B/event 777. Thereafter, Travel.ai Helper 420A forwards the reconstructed response packet along with an intent "POSITIVE_END_INTENT" to 'c$image_success' of intent2.js (of logic controller 1 440A), which inturn forwards to main controller 410 at 799I.

At event 799J, the reconstructed image of boarding pass is displayed at 625 on the Acme chat client window of the end user.

At events 799L and 799M, main controller 410 is shown broadcasting metadata (indicating completion of generating boarding pass task in module 1 of logic controller 440A) to corresponding modules of remaining logic controllers 440B-440X, in view of "POSITIVE_END_INTENT" appended at event 799H. The description is continued assuming the remaining logic controllers are 440B and 440C.

Responsive to the broadcast of metadata, each of the remaining logic controllers 440B and 440C sends a confidence level at events 7990 and 799P respectively.

The description is continued assuming that the next most eligible logic controller is logic controller 3 440C for taxi booking purpose.

Main controller 410 determines that module 3.js of logic controller 3 440C has sent a confidence level that is highest among those sent by corresponding modules of remaining logic controllers 440B and 440C.

In response thereto, main controller 410 updates the internal chat session table to indicate that the current chat session is allocated to logic controller 3 440C for taxi booking purpose.

At event 799Q, main controller 410 invokes module 3.js of logic controller 3 440C (in view of highest confidence level sent by logic controller 3 440C).

Responsive thereto, Taxi.ai Helper 420E (not shown in FIGS. 7A-7C) is invoked (selected according to implementation of logic controller 3 440C), which inturn invokes Taxi.ai Engine 460E (not shown in FIGS. 7A-7C). Taxi.ai Engine 460E examines the configuration data if needed to fetch the URL, user name and password (block 528) and sends the encapsulated packet (cloud packet) to chat server 260D corresponding to Taxi.ai Helper 420E. Chat server 260D is shown to examine the broadcasted metadata and forwards a response assumed to represent the text, "Hi John Doe, would you like to book a taxi from New York airport on 30 Mar. 2018? Yes or No" to module3.js.

The events between module3.js, Taxi.ai Helper 420E, Taxi.ai Engine 460E and chat server 260D are not shown in FIG. 7C and are similar to interactions with respect to module1.js as explained above. The response packet is forwarded to main controller 410 at event 799R. The generated response packet is forwarded to end user at event 799S which is displayed at 626 on the Acme chat client window of the end user.

If the user chooses "No", the chat session ends at that point with no control to modules/intents of logic controller 3 440C.

If the user chooses "Yes", corresponding modules/intents of logic controller 3 440C are invoked in accordance with block 528 of FIG. 5C, using corresponding intents ("intents_5" and "intents_6") though not shown but may be implemented in a similar manner as in blocks 530 and 530 respectively of FIGS. 5D and 5E.

In another embodiment of the present disclosure, at event 791, assuming CRM system 1 280A contains valid passport of the end user (for example, from history of end user's previous interactions), then the reconstructed response message "Sure, I can help you with that. Could you please send across a scanned copy of passport for verification?" is replaced with details of valid passport and is forwarded to main controller 410. Main controller 410 invokes the Travel.ai Helper 420A and reconstructs the boarding pass as described at event 799H. The process continues as described above.

It may further be appreciated that aspects of the present disclosure enable an end user to be served seamlessly using multiple chat servers in a single chat session.

As the interfacing unit 250 providing such a seamless interface is based on configuration data, the administrator is provided more control as to the specific interactions between various systems.

By taking advantage of intents provided by chat servers, the interfacing units are implemented to take advantage of various states determined by the chat services.

While the use of multiple chat servers by interfacing unit 250 is described in examples above as being controlled by configuration data, it should be appreciated that alternative approaches can be implemented to obtain similar feature in other ways as suited in corresponding environments. For example, an end user may specify interest in both tickets and hotel reservations upfront in the first message, for example, at 603 of FIG. 6A, the end user may input "I would like to book a flight from Dubai to New York and also like some hotel reservations". Main controller 410 may split that message into two messages, one for purpose of flight reservation and another for the purpose of hotel reservation, and then process the first message first in accordance with the description above. Thereafter, main controller 410 automatically services the second message upon positive completion of the processing of the first message (e.g., upon receipt of "POSITIVE_END_INTENT") (instead of broadcasting meta data) based on block 520.

Interfacing unit 250 according to aspects of the present disclosure can be implemented using various approaches. The description is continued with respect to an example embodiment in which the features are operative by execution of appropriately designed executable modules.

8. Digital Processing System

Figure 8:
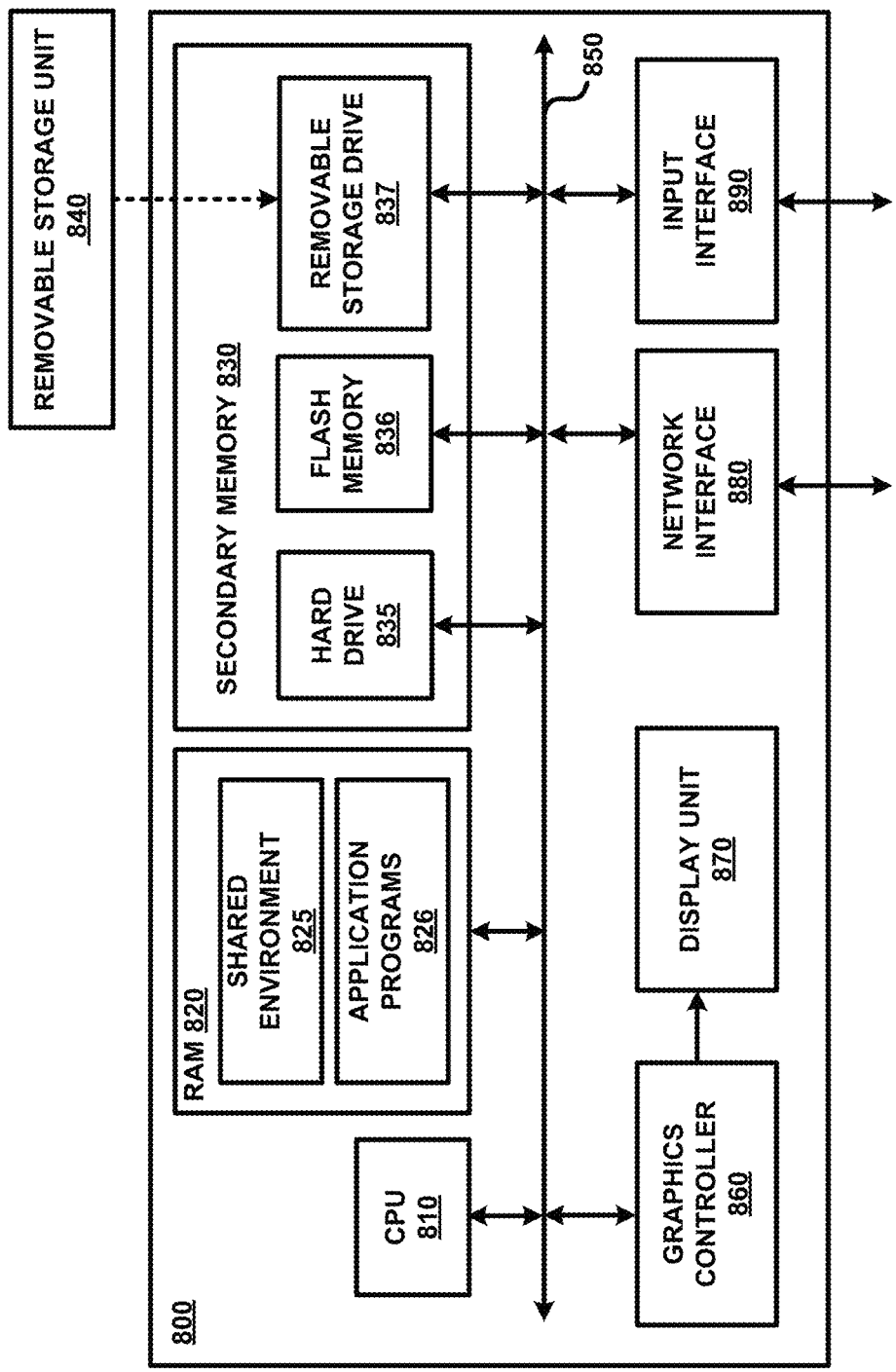
FIG. 8 is a block diagram illustrating the details of digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 corresponds to interfacing unit 250.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and application programs 826. Shared environment 825 includes operating systems, device drivers, virtual machines, etc., which provide a (common) run time environment for execution of application programs 826. The various modules described above may be contained in application programs 826 executing in shared environment 825.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) that may be used to provide appropriate inputs (e.g., for editing the configuration data). Network interface 880 provides connectivity to a network (e.g., using Internet Protocol), and may be used to communicate with other systems (of FIG. 1) connected to the network (140/120).

Secondary memory 830 may contain hard drive 835, flash memory 836, and removable storage drive 837. Secondary memory 830 may store the data (for example, portions of the configuration data as appropriate files) and software instructions (for implementing the flowchart of FIG. 2), which enable digital processing system 800 to provide several features in accordance with the present disclosure. The code/instructions stored in secondary memory 830 either may be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method of managing relationship with users, the method being performed in an interfacing unit, the method comprising:

maintaining a configuration data indicating a respective set of chat servers each available for at least one purpose of a plurality of purposes;

receiving a request on a chat session for a chat conversation from a user for a first purpose;

identifying, based on the configuration data, a first chat server for the first purpose from the respective set of chat servers suitable for generating responses for the chat conversation;

receiving a first sequence of inputs from the user;

interfacing with the first chat server to receive a first sequence of messages corresponding to the first sequence of inputs from the first chat server;

forwarding, on the chat session, as respective first responses to the first sequence of inputs, wherein each first response comprises text of a corresponding message of the first sequence of messages;

determining based on the configuration data, a second chat server for a second purpose for continuation of the chat session, wherein the second purpose is manifested in the conversation between the user and the first chat server on the chat session, wherein the second purpose is different from the first purpose;

receiving a second sequence of inputs, following the first sequence of inputs, from the user on the same chat session;

interfacing with the second chat server to receive a second sequence of messages corresponding to the second sequence of inputs from the second chat server, wherein the chat conversation is continued with the second chat server in the same chat session without requiring selection of the second chat server by the user; and forwarding, on the same chat session, respective second responses to the second sequence of inputs, wherein each second response comprises text of a corresponding message of the second sequence of messages.

2. The method of claim 1, wherein the configuration data further indicates a respective action required for each intent of a respective plurality of intents manifested in chat conversations, the method further comprising:

determining a sequence of current intents manifested at corresponding time instances in the chat conversation;

determining a respective action to be performed for each current intent by examining the configuration data; and performing the corresponding action.

3. The method of claim 2, wherein the interfacing unit switches from the first chat server to the second chat server upon performing a first action, wherein the first action is associated with a first intent in the configuration data, wherein the first intent is contained in the sequence of current intents.

4. The method of claim 3, wherein the first action comprises execution of a module which causes the further actions of:

forwarding, to each of the set of chat servers, a set of metadata representing a current state of the chat conversation as a part of the first action;

determining a set of suitable chat servers depending on the respective responses received from each of the set of chat servers;

setting one of the set of suitable chat servers as the second chat server.

5. The method of claim 4, wherein the configuration data comprises identifiers of a set of customer relationship management (CRM) systems, wherein a second action indicates that a state of the chat conversation is to be stored in one of the CRM systems, and wherein a third action indicates that information is to be retrieved and forward to the second chat server to enable the second chat server to process a request from the user contained in the chat conversation.

6. The method of claim 2, wherein each of the inputs and the messages is according to natural language, wherein the inputs are forwarded to the set of chat servers in natural language and the messages are received from the set of chat servers also in natural language, wherein each intent is received from the corresponding chat server.

7. The method of claim 1, wherein each of said the first sequence of inputs and said the second sequence of inputs is encapsulated in a respective network packet with a destination field indicating that the network packet terminates at the interfacing unit, wherein each of the first sequence of messages and the second sequence of messages is encapsulated in a respective packet with a source field indicating that the packet originates in at the interfacing unit.

8. The method of claim 1, wherein a first message of the first sequence of messages includes a a second portion specifying the second purpose, wherein the interfacing unit services the first purpose in the first sequence of inputs, and thereafter sends the second portion to the second chat server automatically to cause the second purpose also to be serviced.

9. A non-transitory machine readable medium storing one or more sequences of instructions, wherein execution of the one or more instructions by one or more processors contained in an interfacing unit causes the interfacing unit to perform the actions of:

maintaining a configuration data indicating a respective set of chat servers each available for at least one purpose of a plurality of purposes;

receiving a request on a chat session for a chat conversation from a user for a first purpose;

identifying, based on the configuration data, a first chat server for the first purpose from the respective set of chat servers suitable for generating responses for the chat conversation;

receiving a first sequence of inputs from the user;

interfacing with the first chat server to receive a first sequence of messages corresponding to the first sequence of inputs from the first chat server;

forwarding, on the chat session, respective first responses to the first sequence of inputs, wherein each first response comprises text of a corresponding message of the first sequence of messages;

determining based on the configuration data, a second chat server for a second purpose for continuation of the chat session, wherein the second purpose is manifested in the conversation between the user and the first chat server on the chat session, wherein the second purpose is different from the first purpose;

receiving a second sequence of inputs, following the first sequence of inputs, from the user on the same chat session;

interfacing with the second chat server to receive a second sequence of messages corresponding to the second sequence of inputs from the second chat server, wherein the chat conversation is continued with the second chat server in the same chat session without requiring selection of the second chat server by the user; and forwarding, on the same chat session, respective second responses to the second sequence of inputs, wherein each second response comprises text of a corresponding message of the second sequence of messages.

10. The non-transitory machine readable medium of claim 9, wherein the configuration data further indicates a respective action required for each intent of a respective plurality of intents manifested in chat conversations, the actions further comprising:

determining a sequence of current intents manifested at corresponding time instances in the chat conversation;

determining a respective action to be performed for each current intent by examining the configuration data; and performing the corresponding action.

11. The non-transitory machine readable medium of claim 10, wherein the interfacing unit switches from the first chat server to the second chat server upon performing a first action, wherein the first action is associated with a first intent in the configuration data, wherein the first intent is contained in the sequence of current intents.

12. The non-transitory machine readable medium of claim 11, wherein the first action comprises execution of a module which causes the further actions of:

forwarding, to each of the set of chat servers, a set of metadata representing a current state of the chat conversation as a part of the first action;

determining a set of suitable chat servers depending on the respective responses received from each of the set of chat servers;

setting one of the set of suitable chat servers as the second chat server.

13. The non-transitory machine readable medium of claim 12, wherein the configuration data comprises identifiers of a set of customer relationship management (CRM) systems, wherein a second action indicates that a state of the chat conversation is to be stored in one of the CRM systems, and wherein a third action indicates that information is to be retrieved and forward to the second chat server to enable the second chat server to process a request from the user contained in the chat conversation.

14. The non-transitory machine readable medium of claim 10, wherein each of the inputs and the messages is according to natural language, wherein the inputs are forwarded to the set of chat servers in natural language and the messages are received from the set of chat servers also in natural language, wherein each intent is received from the corresponding chat server.

15. The non-transitory machine readable medium of claim 9, wherein each of the first sequence of inputs and the second sequence of inputs is encapsulated in a respective network packet with a destination field indicating that the network packet terminates at the interfacing unit, wherein each of the first sequence of messages and the second sequence of messages is encapsulated in a respective packet with a source field indicating that the packet originates in at the interfacing unit.

16. The non-transitory machine readable medium of claim 9, wherein a first message of the first sequence of messages includes a second portion specifying the second purpose, wherein the interfacing unit services the first purpose in the first sequence of inputs, and thereafter sends the second portion to the second chat server automatically to cause the second purpose also to be serviced.

17. An interfacing unit facilitating management of relationship with users, the interfacing unit comprising:

a memory to store instructions;

one or more processors to execute the instructions stored in the memory to cause the interfacing unit to perform the actions of:

maintaining a configuration data indicating a respective set of chat servers each available for at least one purpose of a plurality of purposes;

receiving a request on a chat session for a chat conversation from a user for a first purpose;

identifying, based on the configuration data, a first chat server for the first purpose from the respective set of chat servers suitable for generating responses for the chat conversation;

receiving a first sequence of inputs from the user;

interfacing with the first chat server to receive a first sequence of messages corresponding to the first sequence of inputs from the first chat server;

forwarding, on the chat session, respective first responses to the first sequence of inputs, wherein each first response comprises text of a corresponding message of the first sequence of messages;

determining based on the configuration data, a second chat server for a second purpose for continuation of the chat session, wherein the second purpose is manifested in the conversation between the user and the first chat server on the chat session, wherein the second purpose is different from the first purpose;

receiving a second sequence of inputs, following the first sequence of inputs, from the user on the same chat session;

interfacing with the second chat server to receive a second sequence of messages corresponding to the second sequence of inputs from the second chat server, wherein the chat conversation is continued with the second chat server in the same chat session without requiring selection of the second chat server by the user; and forwarding, on the same chat session, respective second responses to the second sequence of inputs, wherein each second response comprises text of a corresponding message of the second sequence of messages.

18. The interfacing unit of claim 17, wherein the configuration data further indicates a respective action required for each intent of a respective plurality of intents manifested in chat conversations, the method further comprising:

determining a sequence of current intents manifested at corresponding time instances in the chat conversation;

determining a respective action to be performed for each current intent by examining the configuration data; and performing the corresponding action.

19. The interfacing unit of claim 18, wherein each of the inputs and the messages is according to natural language, wherein the inputs are forwarded to the set of chat servers in natural language and the messages are received from the set of chat servers also in natural language, wherein each intent is received from the corresponding chat server.

20. The interfacing unit of claim 17, wherein each of the first sequence of inputs and the second sequence of inputs is encapsulated in a respective network packet with a destination field indicating that the network packet terminates at the interfacing unit, wherein each of the first sequence of messages and the second sequence of messages is encapsulated in a respective packet with a source field indicating that the packet originates in at the interfacing unit.

* * * * *

UNITED STATES PATENT AND TRADEMARK OFFICE
CERTIFICATE OF CORRECTION

PATENT NO. : 10,594,635 B2
APPLICATION NO. : 15/957932
DATED : March 17, 2020
INVENTOR(S) : Kuncheria et al.

Page 1 of 1

It is certified that error appears in the above-identified patent and that said Letters Patent is hereby corrected as shown below:

In the Specification

In Column 1, Line 62, delete "FIG. 7A-7C" and insert -- FIGS. 7A-7C --, therefor.

In Column 9, Line 50, delete "Figure SI" and insert -- Figure 5I --, therefor.

In Column 10, Line 39, delete "Figure SI" and insert -- Figure 5I --, therefor.

In the Claims

In Column 23, Line 42, in Claim 7, delete "in at" and insert -- at --, therefor.

In Column 23, Line 44, in Claim 8, delete "a a" and insert -- a --, therefor.

In Column 25, Line 14, in Claim 15, delete "in at" and insert -- at --, therefor.

In Column 26, Line 44, in Claim 20, delete "in at" and insert -- at --, therefor.

Signed and Sealed this
Twenty-seventh Day of October, 2020

Andrei Iancu
*Director of the United States Patent and Trademark Office*